(12) United States Patent
Yamaguchi et al.

(10) Patent No.: US 10,880,134 B2
(45) Date of Patent: Dec. 29, 2020

(54) RECEPTION DEVICE, RECEPTION METHOD, AND COMMUNICATION SYSTEM

(71) Applicant: Mitsubishi Electric Corporation, Tokyo (JP)

(72) Inventors: Kanako Yamaguchi, Tokyo (JP); Hiroshi Nishimoto, Tokyo (JP); Kaoru Tsukamoto, Tokyo (JP); Shusaku Umeda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 158 days.

(21) Appl. No.: 16/303,891

(22) PCT Filed: Aug. 5, 2016

(86) PCT No.: PCT/JP2016/073094
§ 371 (c)(1),
(2) Date: Nov. 21, 2018

(87) PCT Pub. No.: WO2018/025400
PCT Pub. Date: Feb. 8, 2018

(65) Prior Publication Data
US 2020/0322192 A1 Oct. 8, 2020

(51) Int. Cl.
*H04L 27/38* (2006.01)
*H04L 25/06* (2006.01)
(Continued)

(52) U.S. Cl.
CPC ......... *H04L 25/067* (2013.01); *H04B 7/0456* (2013.01); *H04L 25/0204* (2013.01); *H04L 27/2071* (2013.01); *H04L 27/38* (2013.01)

(58) Field of Classification Search
CPC ............... H04L 25/067; H04L 25/0204; H04L 27/2071; H04L 27/38; H04B 7/0456
See application file for complete search history.

(56) References Cited

U.S. PATENT DOCUMENTS

| 8,797,837 B2 * | 8/2014 | Li | H04L 5/0007 |
| | | | 370/210 |
| 2011/0080972 A1 * | 4/2011 | Xi | H04B 7/0623 |
| | | | 375/267 |

(Continued)

FOREIGN PATENT DOCUMENTS

| EP | 1895729 A1 | 3/2008 |
| JP | 2011-41194 A | 2/2011 |
| WO | WO 2015/156058 A1 | 10/2015 |

OTHER PUBLICATIONS

Abbott et al., "MultiBand OFDM Physical Layer Specification", WiMedia Alliance, Inc., PHY Specification: Final Deliverable 1.5, Aug. 11, 2009, 204 pages.

(Continued)

*Primary Examiner* — David S Huang
(74) *Attorney, Agent, or Firm* — Birch, Stewart, Kolasch & Birch, LLP

(57) ABSTRACT

A reception device includes: a reception unit receiving transmission signals; a splitting unit splitting received signals into real component and imaginary component; a narrowing unit narrowing down possible signal point candidates of real component of the signal and imaginary component of the signal to signal point candidates based on the real component and the imaginary component of the split received signal; a signal point candidate hypothesizing unit hypothesizing one signal point candidate of real component from the signal point candidates of real component obtained by narrowing-down and hypothesizing one signal point candidate of imaginary component from the signal point candidates of imaginary component obtained by narrowing-down; and a signal estimation value calculating unit estimating real component of the signal based on the one hypothesized real component signal point candidate and estimating imaginary component of the signal based on the (Continued)

one hypothesized imaginary component signal point candidate.

8 Claims, 10 Drawing Sheets

(51) Int. Cl.
    *H04L 25/02* (2006.01)
    *H04B 7/0456* (2017.01)
    *H04L 27/20* (2006.01)

(56) References Cited

U.S. PATENT DOCUMENTS

2013/0089121 A1    4/2013    Koo et al.
2017/0005673 A1    1/2017    Yamamoto

OTHER PUBLICATIONS

Kim, et al., "Low-Complexity Soft-ML Detection Algorithm for Modified-DCM in WiMedia UWB Systems", IEICE Transations on Communications, vol. E96-B, No. 3, Mar. 2013, p. 910-913.
Wakamiya, et al., "Spreading Code Sequences Appropriate for Maxium Likelihood Detection in MC-CDMA", IEICE Technical Report, RCS2009-48, 2009, p. 113-118.
Yamaguchi, et al., "Serial Concatenation Approach of Spectral Precoding and DSTBC Enabling Two-dimensional Diversity", IEICE Technical Report, RCS2015-49, 2015, p. 19-24.
Office Action issued in the corresponding Indian Patent Application No. 201947001585 dated Aug. 3, 2020.
Extended European Search Report, dated May 16, 2019, for European Application No. 16911659.7.
Park et al., "A Low Complexity Soft-Output Detection Algorithm for 2×2 Multiple-Input Multiple-Output Multiband-OFDM Systems Using Dual Carrier Modulation", IEEE: Transactions on Consumer Electronics, vol. 60, No. 3, Aug. 2014, pp. 311-319 ( 9 pages).

\* cited by examiner

RECEPTION DEVICE, RECEPTION METHOD, AND COMMUNICATION SYSTEM

FIELD

The present invention relates to a reception device that demultiplexes multiplexed signals, a reception method, and a communication system including such a reception device.

BACKGROUND

To achieve high-capacity radio transmission, broadband communication that uses a very wide band for communication has recently attracted attention. For example, the ultra wideband (UWB) radio transmission is a system for broadband radio communication with a bandwidth of 500 MHz or higher or at a fractional bandwidth of 20% or higher. The MultiBand OFDM Alliance Special Interest Group (MBOA SIG), which is an organization that promotes the UWB radio transmission, develops specifications of physical layers and media access layers to which the multiband orthogonal frequency division multiplexing (OFDM) technique is applied. In particular, Non Patent Literature 1 describes employment of the dual carrier modulation (DCM) technique for achieving a transmission diversity effect by multiplexing a plurality of modulated signals by a precoding matrix or the like and transmitting the multiplexed signals via different frequency bands in physical layers.

Non Patent Literature 2 teaches obtaining a frequency diversity effect at a symbol level even when the OFDM is applied, by performing code multiplexing using spreading codes. In a case where signals are multiplexed at the transmitting end in this manner, the multiplexed signals need to be demultiplexed when the signals are detected at the receiving end. A typical example of a method for demultiplexing received signals is to use a linear detector that uses the zero forcing (ZF) method, the minimum mean square error (MMSE) method, or the like. These techniques have an advantage in that the amount of computation is small, which enables the configuration of a receiver to be simplified, but may cause degradation in characteristics due to noise enhancement or the like in signal demultiplexing.

In addition, the maximum likelihood detection (MLD) method is provided as an optimum method among many other signal demultiplexing methods. This method performs signal demultiplexing by obtaining the distances between a received signal vector and possible signal point vectors for all the signal point candidates and by determining a signal point with the shortest distance as an estimated signal vector. Since comparison is performed for all the possible signal points, this method can achieve excellent transmission characteristics as compared with the aforementioned linear detector using the ZF method, the MMSE method, or the like. Since, however, the number of signal point candidates increases exponentially with the increase in the modulation level, the number of transmission antennas and/or the number of multiplexed signals, the amount of computation may become so enormous that it is difficult to implement this method.

CITATION LIST

Non Patent Literatures

Non Patent Literature 1: Wimedia Alliance Inc., "Multiband OFDM Physical Layer Specification", Final Deliverable 1.5, August 2009

Non Patent Literature 2: Akira WAKAMIYA, Kenichi HIGUCHI, "Spreading Code Sequences Appropriate for Maximum Likelihood Detection in MC-CDMA", The Institute of Electronics, Information and Communication Engineers (IEICE), Japan Technical Report, RCS2009-48, June 2009

Non Patent Literature 3: Kanako YAMAGUCHI, Nicola Gresset, Hiroshi NISHIMOTO, Shusaku UMEDA, Kaoru TSUKAMOTO, Akihiro OKAZAKi, Atsushi OKAMURA, "Serial Concatenation Approach of Spectral Precoding and DSTBC Encoding Two-dimensional Diversity", The Institute of Electronics, Information and Communication Engineers (IEICE), Japan Technical Report, RCS2015-49, June 2015

Non Patent Literature 4: Kilhwan KIM, Jangyong PARK, Jihun KOO, Yongsuk KIM, and Jaeseok KIM, "Low-Complexity Soft-ML Detection Algorithm for Modified DCM in WiMedia UWB Systems", IEICE Trans. Commun., vol. E96-B, no. 3, March 2013

SUMMARY

Technical Problem

Non Patent Literatures 3 and 4 teach, as a technique for reducing the amount of computation in the MLD method, a technique of determining the real component and the imaginary component of a signal independently of each other, and further using the signal having the real component or the imaginary component that is sequentially hypothesized using signal point candidates to estimate the real component or the imaginary component of a remaining one signal, which is not hypothesized. This method can achieve signal demultiplexing characteristics equivalent to those of the MLD method and reduction in the amount of computation; however, the number of signal point candidates used for hypothesizing is large, and the amount of computation is thus still large.

An object of the present invention is to reduce the amount of computation in a signal demultiplexing process.

Solution to Problem

To solve the problem and achieve the object described above, a reception device according to an aspect of the present invention includes: a reception unit to receive a plurality of transmission signals via propagation paths orthogonal to each other, the transmission signals being obtained by multiplexing a plurality of first signals by using a precoding matrix, the first signals being L (L is an integer of 2 or larger) complex baseband signals whose real component and imaginary component are modulated independently of each other; a splitting unit to split each of a plurality of received signals received by the reception unit into a real component and an imaginary component; a narrowing unit to narrow down possible signal point candidates of a real component of the first signal to signal point candidates on a basis of the real component of the split received signal and narrow down possible signal point candidates of an imaginary component of the first signal to signal point candidates on a basis of the imaginary component of the split received signal; a signal point candidate hypothesizing unit to hypothesize one signal point candidate of a real component from the signal point candidates of a real component obtained by the narrowing down and hypothesize one signal point candidate of an imaginary component from the signal point candidates of an imaginary component obtained by the narrowing down; and a signal estimation value calculating unit to estimate a real component of the first signal on a basis of the one hypothesized real component signal point candidate and estimate an imaginary component of the first signal on a basis of the one hypothesized imaginary component signal point candidate.

Advantageous Effects of Invention

According to the present invention, the amount of computation in a signal demultiplexing process is reduced.

DESCRIPTION OF EMBODIMENTS

Figure 1:
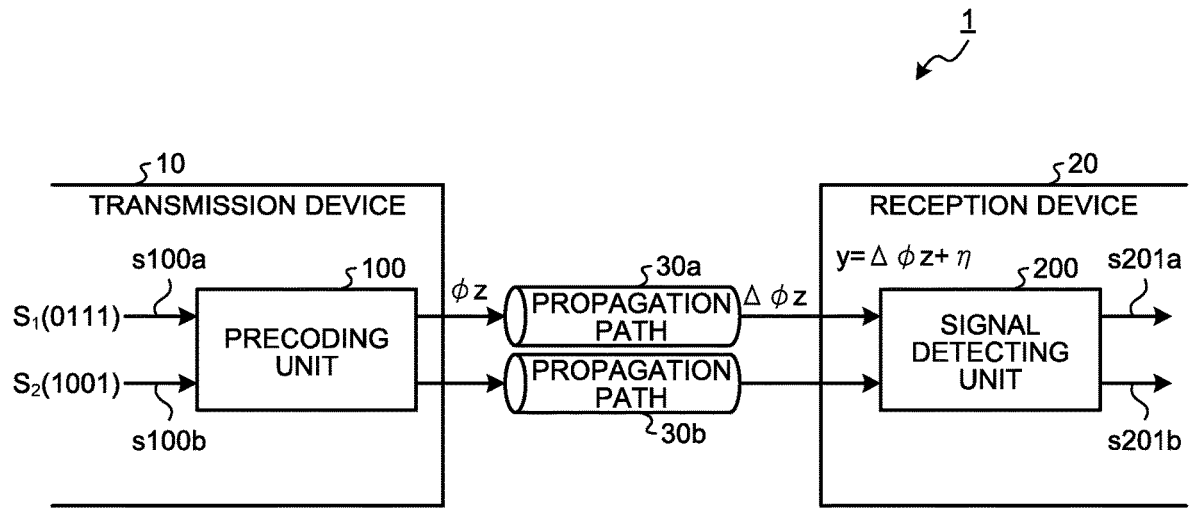
FIG. 1 is a diagram illustrating an example configuration of a communication system according to a first embodiment of the present invention.

Embodiments of a reception device, a reception method, and a communication system according to the present invention will be described in detail below with reference to the drawings. In the description below, the same or corresponding components will be represented by the same reference numerals.

First Embodiment

An example configuration of a communication system 1 in a first embodiment according to the present invention is illustrated in FIG. 1.

The communication system 1 includes a transmission device 10 and a reception device 20. The transmission device 10 transmits a transmission signal to the reception device via propagation paths 30a and 30b.

Herein, a case where a plurality of modulated complex baseband signals are multiplexed by a real number precoding matrix and transmitted by the transmission device 10 via propagation paths orthogonal to each other will be described.

In the present embodiment, a case where the number L of signals multiplexed by precoding is L=2 and two radio signals input to a precoding unit 100 are each modulated by the 16 QAM (quadrature amplitude modulation) technique will be described. The present embodiment is not limited to this, and is applicable to cases where complex baseband signals are modulated by a $2^{2N}$-QAM technique (N is an integer of 2 or larger).

The transmission device 10 performs modulation and precoding processes on information signals $s_1$ and $s_2$ to be transmitted to the reception device 20, and then transmits the resulting information signals $s_1$ and $s_2$ to the reception device 20 via the propagation paths 30a and 30b. The reception device 20 performs a demultiplexing process on the received signals and decodes the information signals $s_1$ and $s_2$.

The precoding unit 100 of the transmission device 10 performs a modulation process and a multiplexing process on the information signals $s_1$ and $s_2$ received via the signal lines s100a and s100b, respectively. The precoding unit 100 performs the modulation process on the information signals $s_1$ and $s_2$ such as (0111) and (1001), to generate modulated signals (first signals) $z_1$ and $z_2$, which are complex baseband signals. Note that the information signals $s_1$ and $s_2$ correspond one-to-one to the modulated signals $z_1$ and $z_2$, respectively, which are complex baseband signals; the difference therebetween is only that the modulated signals $z_1$ and $z_2$ are modulated. Either of the information signals $s_1$ and $s_2$ and the modulated signals $z_1$ and $z_2$ will be used in the description below. The precoding unit 100 further performs the multiplexing process on the modulated signals $z_1$ and $z_2$ on the basis of a precoding matrix that the precoding unit 100 holds. The two multiplexed radio signals are output to the transmission paths 30a and 30b orthogonal to each other by the precoding unit 100. In the precoding unit 100, the two signals are multiplexed by a precoding matrix with a phase rotation of an integral multiple of 90 degrees. A real number precoding matrix refers to a matrix defining the mixture ratios of the complex baseband signals $z_1$ and $z_2$ in respective transmission paths when two transmission paths are used for transmitting the complex baseband signals $z_1$ and $z_2$. Note that the precoding matrix is shared with the reception device 20, and the reception device 20 can use the matrix for decoding received signals.

The precoding unit 100 performs the multiplexing process on signals by multiplying a modulated signal vector z, which is a vector value of the complex baseband signals to be transmitted, by the precoding matrix $\phi$, and sends (as a transmission unit) the multiplexed signals to the propagation paths. Thus, the vector of signals output by the precoding unit 100 can be expressed as $z\phi$.

The signals transmitted by the transmission device 10 are affected by each of the propagation paths 30a and 30b while passing through the propagation paths 30a and 30b. The influence on a transmitted signal can be expressed by a transfer function matrix Δ, which can be estimated by the transmission device 10, the reception device 20, or another device that is not illustrated. The reception device 20 has the information on the transfer function matrix Δ. In addition, a noise vector η is further added to a signal transmitted by the transmission device 10 at an input terminal of the reception device 20.

A received signal vector y subjected to the aforementioned influence and input to the reception device 20 is composed of $y_1$ and $y_2$, which are complex baseband signals, and can be expressed as an n-dimensional complex vector, n being equal to the number of orthogonal propagation paths (two in the present embodiment). The received signal vector y is expressed by the following formula using an equivalent channel matrix H composed of the real number precoding matrix ϕ by which the modulated signal vector z is multiplied in the transmission device 10 and the transfer function matrix Δ of the propagation paths estimated in the reception device and the transmission device 10, the modulated signal vector z, and the noise vector η added at the input terminal of the reception device.

$$y = \Delta\phi z + \eta \quad (1)$$

$$\begin{bmatrix} y_1 \\ y_2 \end{bmatrix} = \begin{bmatrix} \Delta_1 & 0 \\ 0 & \Delta_2 \end{bmatrix} \begin{bmatrix} \phi_{11} & \phi_{12} \\ \phi_{21} & \phi_{22} \end{bmatrix} \begin{bmatrix} z_1 \\ z_2 \end{bmatrix} + \eta$$

$$= Hz + \eta$$

$$= \begin{bmatrix} h_1 & h_2 \end{bmatrix} \begin{bmatrix} z_1 \\ z_2 \end{bmatrix} + \eta$$

An equivalent channel vector $h_1$ represents a vector component corresponding to the received signal $y_1$ in the equivalent channel matrix H, and an equivalent channel vector $h_2$ represents a vector component corresponding to the received signal $y_2$ in the equivalent channel matrix H. The received signal vector y input to the reception device 20 is input to a signal detecting unit 200.

The reception device 20 also functions as a reception unit for receiving signals, and performs a process for obtaining, on the basis of the received signal vector y that is received, the modulated signal vector z that is transmitted.

The signal detecting unit 200 has a function of demultiplexing the two input radio signals, estimates the two demultiplexed radio signals, and outputs the respective likelihoods of the estimated signals.

Next, the signal detecting unit 200 of the first embodiment according to the present invention will be described with reference to FIG. 2.

The signal detecting unit 200 in the present embodiment includes a signal splitting unit 210, estimated signal vector calculating units 220a and 220b, and a signal determining unit 230.

The received signal vector y received by the reception device 20 is input to the signal splitting unit 210 via signal lines s200a and s200b. The signal splitting unit 210 functions as a splitting unit that splits the complex baseband signals $y_1$ and $y_2$ of the input received signal vector y into real components and imaginary components. The signal splitting unit 210 further outputs a real component signal vector composed of the real component of the complex baseband signal $y_1$ input from the signal line s200a and the real component of the complex baseband signal $y_2$ input from the signal line s200b to the estimated signal vector calculating unit 220a, and outputs an imaginary component signal vector composed of the imaginary component of the signal $y_1$ input from the signal line s200a and the imaginary component of the signal $y_2$ input from the signal line s200b to the estimated signal vector calculating unit 220b.

The estimated signal vector calculating units 220a and 220b have functions of, by a method that will be described later, narrowing down possible signal point candidates (possible component candidates) of a signal of one component of the modulated signal vector z, which is multiplexed by using the real number precoding matrix, to signal point candidates by using the real components and the imaginary components of the signals obtained by splitting by the signal splitting unit 210, i.e., selecting signal point candidates from the possible signal point candidates, and of calculating an estimated value of the other component of the modulated signal vector z at the signal point candidate resulting from narrowing down. The estimated signal vector calculating units 220a and 220b output, to the signal determining unit 230, estimated signal vectors, each of which is composed of a signal component that is hypothesized one of possible signal point candidates (possible component candidates) and a signal component estimated by using the hypothesized signal component.

In the present embodiment, to "hypothesize" the real component of a signal or the imaginary component of a signal means to select one particular value among symbol values that can be represented by the signal as a candidate and provisionally determine the symbol value to be the selected value to be used for subsequent calculation processes. An estimated value calculating unit calculates the other value on the basis of the provisionally determined symbol value, and each signal estimating unit outputs a hypothesized signal value and a signal value calculated on the basis of the hypothesized signal value to the signal determining unit 230. The signal determining unit 230 calculates the likelihoods of the estimated signal vectors by using the hypothesized signal values and the signal values calculated on the basis of the hypothesized signal values, the signal values being output from the respective signal estimating units.

The signal determining unit 230 functions as a likelihood calculating unit that outputs, via signal lines s201a and s201b, the likelihoods of two most probable estimated signal vectors among a plurality of input estimated signal vectors. For example, the signal determining unit 230 outputs the likelihood of one estimated signal real component vector that is most probable via the signal line s201a, and outputs the likelihood of one estimated signal imaginary component vector that is most probable via the signal line s201b.

Next, a configuration of the estimated signal vector calculating unit 220a in the present embodiment will be described with reference to FIG. 3.

The estimated signal vector calculating unit 220a includes two candidate point selecting units 221a and 221b and three signal estimating units 222a to 222c. The signal estimating unit 222a includes two hypothesizing units 223a and 223b and two estimated value calculating units 224a and 224b, the signal estimating unit 222b includes two hypothesizing units 223c and 223d and two estimated value calculating units 224c and 224d, and the signal estimating unit 222c includes two hypothesizing units 223e and 223f and two estimated value calculating units 224e and 224f.

The candidate point selecting units 221a and 221b function as narrowing units (selecting units) having functions of, on the basis of the values of the received signals (real components of $y_1$ and $y_2$), selecting three signal point candidates hypothesized by the hypothesizing units 223a to 223f from among all the possible signal point candidates of either one of two modulated signals ($z_1$, $z_2$), which are multiplexed by using the real number precoding matrix, i.e., narrowing down all the possible signal point candidates of either one of two modulated signals to three signal point candidates hypothesized by the hypothesizing units $223a$ to $223f$. The hypothesizing units $223a$ to $223f$ hypothesize the modulated signal $z_1$ or the modulated signal $z_2$ on the basis of the signal point candidates selected by the candidate point selecting unit $221a$ or $221b$, and the estimated value calculating units $224a$ to $224f$ estimate the other of the modulated signal $z_1$ and the modulated signal $z_2$ on the basis of the value of the hypothesized modulated signal $z_1$ or modulated signal $z_2$.

In the present embodiment, the case where the number L of signals multiplexed by the precoding matrix is L=2 and the 16 QAM technique in which the modulated signals to be multiplexed each hold information in which a real component and an imaginary component are each represented by 2 bits, i.e., four signal point candidates is applied is described. The candidate point selecting units $221a$ and $221b$ each select three signal point candidates to be used by the hypothesizing units $223a$ to $223f$ from among the four possible signal point candidates, i.e. narrow down the four possible signal point candidates to three signal point candidates, on the basis of the values of the received signals. Thus, the number of combinations of the signals hypothesized by the hypothesizing units $223a$ to $223f$ and the selected possible signal point candidates is L×3=6, and the estimated signal vector calculating unit $220a$ thus includes six hypothesizing units $223a$ to $223f$. In a case where a $2^{2N}$-QAM technique (N is an integer of 2 or larger) in which information expressing each of the real component and the imaginary component by $2^N$ signal point candidates is held is applied, similar effects can be produced by selecting ($2^{N-1}+1$) signal point candidates from among the possible $2^N$ signal point candidates by each of the candidate point selecting units.

The flow of the aforementioned processes will be described in detail below.

First, the candidate point selecting units $221a$ and $221b$ select signal point candidates to be used by the subsequent hypothesizing units $223a$ to $223f$ from among all the possible signal point candidates of the real component $Re(z_1)$ or $Re(z_2)$ of the modulated signal vector on the basis of the real component $Re(y)$ of the received signal vector.

Figure 4:
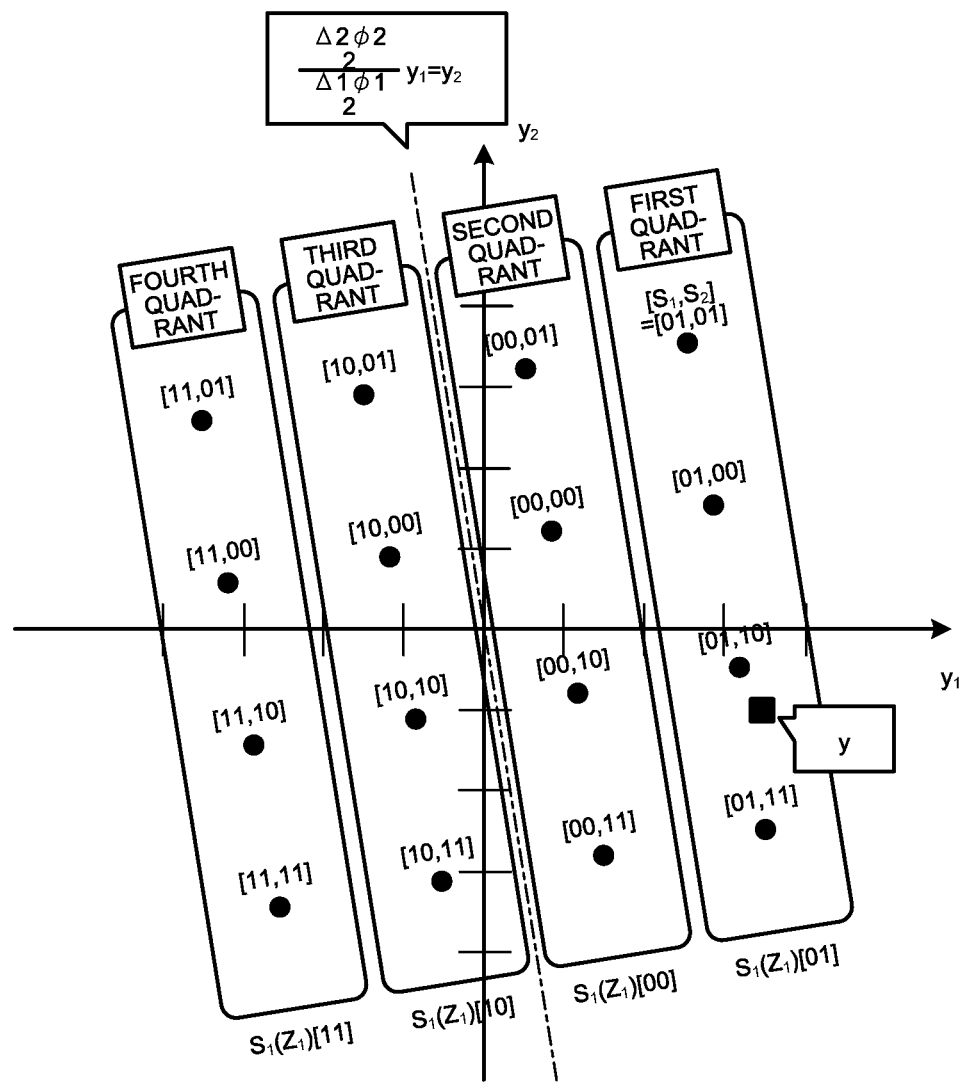
FIG. 4 is a diagram illustrating signal point arrangement of a real component of a received signal according to the first embodiment of the present invention.

In the present embodiment, since the case where the 16 QAM technique is applied as the modulation method for the modulated signals $z_1$ and $z_2$ is presented, all the possible signal point candidates of each of the real components $Re(z_1)$ and $Re(z_2)$ of the modulated signals are four signal point candidates (01, 00, 10, 11) (Although the signal values are some of the signal values of the information signals $s_1$ and $s_2$ and are different from the values of the real components $Re(z_1)$ and $Re(z_2)$ of the modulated signals, these values correspond one-to-one to each other and the values of the information signals $s_1$ and $s_2$ will be used in the description herein for simplicity of explanation). FIG. 4 illustrates signal point arrangement where the horizontal axis represents the real component $Re(y_1)$ of the received signal and the vertical axis represents the real component $Re(y_2)$ of the received signal.

On the assumption that no noise is introduced at the input terminal of the reception device 20, since the real number precoding matrix φ and the transfer function matrix Δ of the propagation paths are known at the reception device 20, theoretical values of the real component of the received signal vector y can be calculated by formula (1) on the basis of the four signal point candidates (01, 00, 10, 11) of each of the real components $Re(z_1)$ and $Re(z_2)$ of the modulated signals. In FIG. 4, 16 theoretical values of the real component of the received signal vector y obtained by the calculation are plotted.

The actual value of the real component of the received signal vector y should agree with one of the 16 points when no noise is present, but the actual value often deviates from the theoretical value owing to the influence of noise.

In FIG. 4, one example of the real component $Re(y)$ of the received signal vector that is actually input to the estimated signal vector calculating unit 220a is plotted. When the real component $Re(y)$ of the received signal vector is assumed to be the point in FIG. 4, the candidate point (01) of the real component $Re(z_1)$ of the modulated signal is the closest point, and (01) is thus deemed to be the most suitable as a candidate of the real component $Re(z_1)$ of the modulated signal to be used for hypothesizing, that is, to be most likely to agree with the real component $Re(z_1)$.

In the present embodiment, the candidate point to be used as the hypothesized signal value of the real component $Re(z_1)$ of the modulated signal is determined based on the quadrant in which the real component $Re(y)$ of the received signal vector is included in FIG. 4. In FIG. 4, a first quadrant is a region in which the distance to the signal point candidate where the real component $Re(z_1)$ of the modulated signal is (01) is the closest as compared with the distances to the other signal point candidates. A second quadrant is a region in which the distance to the signal point candidate where the real component $Re(z_1)$ of the modulated signal is (00) is the closest as compared with the distances to the other signal point candidates. A third quadrant is a region in which the distance to the signal point candidate where the real component $Re(z_1)$ of the modulated signal is (10) is the closest as compared with the distances to the other signal point candidates. A fourth quadrant is a region in which the distance to the signal point candidate where the real component $Re(z_1)$ of the modulated signal is (11) is the closest as compared with the distances to the other signal point candidates. The candidate point selecting unit 221a calculates the respective regions, and determines the region (quadrant) in which the real component $Re(y)$ of the received signal vector is included. The regions can be calculated on the basis of the arrangement of the signal point candidates by using the slope of a line connecting the signal point candidates where the real component $Re(z_1)$ is (01) and/or the distances between the candidate points where the real component $Re(z_1)$ is (01) and the candidate points where the real component $Re(z_1)$ is (00), for example. One example of the method of the calculation will be described later. Alternatively, the regions need not be calculated by the candidate point selecting unit 221a, but may be calculated by the transmission device 10 and the region information may be shared by the transmission device 10 and the reception device 20. The candidate point selecting unit 221a outputs the real component $Re(z_1)$ of the modulated signal associated with the quadrant in which the real component $Re(y)$ is contained to the hypothesizing units 223a to 223f on the basis of the result of determination so that the real component $Re(z_1)$ will be used for hypothesizing.

For the signal determining unit 230 to output the likelihood of a signal, an inverted bit also needs to be used in the likelihood calculation. Thus, in the example of FIG. 4, the signal point candidates (00) and (10) associated with the quadrants close to the first quadrant (close to the real component $Re(y)$) among the signal point candidates including an inverted bit with respect to each bit of (01) are also output to the hypothesizing units 223c and 223e, and the hypothesizing units 223c and 223e hypothesize signal points on the basis of the signal point candidates.

The hypothesizing units 223a to 223f are devices that each hypothesize the input signal point candidate among the signal point candidates selected by the candidate point selecting unit 221a or 221b as either one of two modulated signals multiplexed using a real number precoding matrix. The hypothesizing units 223a to 223f each hypothesize the input signal point candidate among the signal point candidates selected by the candidate point selecting unit 221a or 221b as the modulated signal other than the signal to be estimated, and send the hypothesized signal point candidate to a corresponding one of the estimated value calculating units 224a to 224f. Note that, in the present embodiment, the candidate point selecting units 221a and 221b input values of different signal point candidates to the hypothesizing units 223a to 223f. The signal point candidates that are input are, however, not limited to the above, and the candidate point selecting units 221a and 221b may input all the selected signal point candidates to each of the hypothesizing units 223a to 223f (which means, in the description above, that the candidate point selecting unit 221a inputs three signal point candidates to each of the hypothesizing units 223a, 223c, and 223e, and the candidate point selecting unit 221b inputs three signal point candidates to each of the hypothesizing units 223b, 223d, and 223f), and each of the hypothesizing units 223a to 223f may hypothesize one signal point candidate among the signal point candidates input from the candidate point selecting unit 221a or 221b so that the hypothesized signal point candidate does not overlap with those of the other hypothesizing units.

The estimated value calculating units 224a to 224f each calculate an equivalent channel composed of a real number precoding matrix and transfer functions of propagation paths, which are estimated by the hypothesizing units 223a to 223f or devices that are not illustrated, subtract the hypothesized signal component and the equivalent channel component corresponding to the signal from the received signal, and input an estimated value of the modulated signal that is not hypothesized (signal to be estimated) obtained as a result of the subtraction as an estimated signal vector together with the signal hypothesized using the signal point candidates to the signal determining unit. Thus, the estimated value calculating units 224a to 224f function as signal estimation value calculating units.

Here, an example of a quadrant (region) determination method and a hypothesized candidate narrowing method for determining the quadrant (region) to which the received signal vector y belongs and determining the signal point candidate to be selected as a hypothesized candidate in the present embodiment will be described.

In FIG. 4, a dashed-dotted line is drawn at the boundary between the second quadrant and the third quadrant, which is defined by formula (2). In addition, the first quadrant and the second quadrant satisfy formula (3), and the third quadrant and the fourth quadrant satisfy formula (4).

$$\frac{\Delta_2 \phi_{22}}{\Delta_1 \phi_{12}} \text{Re}(y_1) = \text{Re}(y_2) \quad (2)$$

$$\frac{\Delta_2 \phi_{22}}{\Delta_1 \phi_{12}} \text{Re}(y_1) \leq \text{Re}(y_2) \quad (3)$$

$$\frac{\Delta_2 \phi_{22}}{\Delta_1 \phi_{12}} \text{Re}(y_1) > \text{Re}(y_2) \quad (4)$$

Note that, because signals in adjacent quadrants are gray-coded signals, which have only one bit different from each other and because the 16 QAM is applied as a modulation method, the quadrants that are closest to the quadrant in which the received signal vector y is included among the quadrants associated with the signal point candidates in which an inverted bit corresponding to each bit is included are always two quadrants close to the received signal vector y. For example, in a case where the received signal vector y is present in the first quadrant as in FIG. 4, the quadrants that are associated with the signal point candidates including an inverted bit with respect to each bit of the signal point candidate in the first quadrant and that are closest to the quadrant in which the received signal vector y is included are the second and third quadrants. Alternatively, in a case where the received signal vector y is present in the second quadrant, the quadrants that are associated with the signal point candidates including an inverted bit with respect to each bit of the signal point candidate in the second quadrant and that are closest to the quadrant in which the received signal vector y is included are the first and third quadrants. In addition, in a case where the received signal vector y is present in the third quadrant, the quadrants that are associated with the signal point candidates including an inverted bit with respect to each bit of the signal point candidate in the third quadrant and that are closest to the quadrant in which the received signal vector y is included are the second and fourth quadrants. Furthermore, in a case where the received signal vector y is present in the fourth quadrant, the quadrants that are associated with the signal point candidates including an inverted bit with respect to each bit of the signal point candidate in the fourth quadrant and that are closest to the quadrant in which the received signal vector y is included are the second and third quadrants.

Thus, in the case where the received signal vector y is present in the first or second quadrant (in the case where the real component Re(y) of the received signal vector satisfies formula (3)), the signal point candidates (01, 00) present in the first quadrant and the second quadrant and the signal point candidate (10) present in the third quadrant are selected as hypothesized candidates by the candidate point selecting unit 221a.

In the case where the received signal vector y is present in the third or fourth quadrant (in the case where the real component Re(y) of the received signal vector satisfies formula (4)), the signal point candidates (10, 11) present in the third quadrant and the fourth quadrant and the signal point candidate (00) present in the second quadrant are selected as hypothesized candidates by the candidate point selecting unit 221a.

In a similar manner, when the region in which the signal point candidate that is closest to the real component Re(y) of the received signal vector is 01 among the signal point candidates of the real component modulated signal Re($y_2$) is a first quadrant of the signal $z_2$, the region in which such a signal point candidate is 00 is a second quadrant of the signal $z_2$, the region in which such a signal point candidate is 10 is a third quadrant of the signal $z_2$, and the region in which such a signal point candidate is 11 is a fourth quadrant of the signal $z_2$, the first quadrant and the second quadrant satisfy formula (5), and the third quadrant and the fourth quadrant satisfy formula (6). When the real component Re(y) of the received signal vector satisfies formula (5), the candidate point selecting unit 221b selects the signal point candidates (01, 00, 10) in the first to third quadrants.

$$\frac{\Delta_2 \phi_{21}}{\Delta_1 \phi_{11}} y_1 \leq y_2 \quad (5)$$

$$\frac{\Delta_2 \phi_{21}}{\Delta_1 \phi_{11}} y_1 > y_2 \quad (6)$$

Alternatively, when the real component Re(y) of the received signal vector satisfies formula (6), the candidate point selecting unit 221b selects the signal point candidates (00, 10, 11) in the second to fourth quadrants.

In a similar manner, in a case where signals to be multiplexed using a real number precoding matrix are modulated by a $2^{2N}$-QAM technique (N is an integer of 2 or larger), that is, in a case where each of the real component and the imaginary component of modulated signals is expressed by $2^N$ signal point candidates, first to $2^{N-1}$-th orthants of the modulated signal $z_1$ satisfy formula (3), $(2^{N-1}+1)$-th to $2^N$-th orthants of the modulated signal $z_1$ satisfy formula (4), first to $2^{N-1}$-th orthants of the modulated signal $z_2$ satisfy formula (5), and $(2^{N-1}+1)$-th to $2^N$-th orthants of the modulated signal $z_2$ satisfy formula (6). In this case, when the real component Re(y) of the received signal vector satisfies formula (3) or (5), the candidate point selecting units 221a and 221b select signal point candidates in the first to $(2^{N-1}+1)$-th orthants of the modulated signal $z_1$ or $z_2$ as signal point candidates to be used by subsequent hypothesizing units. Alternatively, when the real component Re(y) of the received signal vector satisfies formula (4) or (6), the candidate point selecting units 221a and 221b select signal point candidates in the $2^{N-1}$-th to $2^N$-th orthants of the modulated signal $z_1$ or $z_2$.

Hereinafter, a flow of processes performed by the candidate point selecting unit 221a and subsequent components in a case where the real component Re(y) of the received signal vector is present in the first quadrant of the signal $z_1$ as illustrated in FIG. 4, for example, and the candidate point selecting unit 221a selects 01, 00, and 10 as the signal point candidates of the real component modulated signal Re($z_1$) to be used by the hypothesizing unit 223a will be described in detail.

Since 01 of the signal point candidates (01, 00, 10) selected by the candidate point selecting unit 221a is input, the hypothesizing unit 223a hypothesizes this signal point. The following formula is obtained by subtracting the hypothesized real component modulated signal $z_1$(with hat) and an equivalent channel vector $h_1$ associated with the hypothesized signal from the real component Re(y) of the received signal vector.

$$\text{Re}(y - h_1 \hat{z}_1) = \text{Re}(Hz - h_1 \hat{z}_1 + \eta) \quad (7)$$
$$= \text{Re}\{h_1(z_1 - \hat{z}_1) + h_2 z_2 + \eta\}$$

Note that Re(·) represents a real component, and the equivalent channel vector $h_1$ is estimated, for example, by an existing technique using a pilot signal by the reception device 20. When the real component modulated signal $z_1$(with hat) hypothesized as being 01 is assumed to be equal to the real component Re($z_1$) of the modulated signal input from either of s200a or s200b, only the modulated signal $z_2$ component of the second term and the noise component of the third term remain on the right side of formula (7). On this basis, the estimated value calculating unit 224a calculates an estimated value $z_2$ (with acute) of the real component of the modulated signal $z_2$ by using the following formula (8), and outputs a real component estimated signal vector z (with acute) composed of the modulated signal $z_1$(with hat) hypothesized by the hypothesizing unit 223a and the estimated value $z_2$ (with acute) calculated by the estimated value calculating unit 224a.

[Formula 5]

$$\acute{z}_2 = \frac{\text{Re}\{h_2^H (y - h_1 \hat{z}_1)\}}{\|h_2\|^2} \quad (8)$$

Note that $(\cdot)^H$ represents Hermitian transpose.

As described above, the candidate point selecting unit 221a selects 01, 00, and 10 as signal point candidates to be used by the hypothesizing units 223a, 223c, and 223e from all the possible signal point candidates of the real component Re($z_1$) of the modulated signal on the basis of the value of the real component Re(y) of the received signal vector. In a similar manner, the candidate point selecting unit 221b selects the signal point candidates to be used by the hypothesizing units 223b, 223d, and 223f from all the possible signal point candidates of the real component Re($z_2$) of the modulated signal on the basis of the value of the real component Re(y) of the received signal vector.

In addition, the hypothesizing unit 223a hypothesizes 01 as the modulated signal $z_1$ from among 01, 00, and 10 that are signal point candidates selected by the candidate point selecting unit 221a, and the subsequent estimated value calculating unit 224a calculates an estimated value of the other modulated signal $z_2$ by using the hypothesized signal. In a similar manner, the hypothesizing units 223b to 223f each hypothesize one signal point candidate as the modulated signal $z_1$ or $z_2$ from among the signal point candidates selected by the candidate point selecting unit 221a or 221b, and the estimated value calculating units 224b to 224f each calculate an estimated value of the other modulated signal (signal to be estimated) by using the hypothesized signal.

In the present embodiment, since the 16 QAM technique is applied, six estimated signal vectors are output from each of the estimated signal vector calculating units, that is, a total of 12 estimated signal vectors are output. In a similar manner, in a case where a $2^{2N}$-QAM technique (N is an integer of 2 or larger) is applied, $2(2^{N-1}+1)$ estimated signal vectors are output from each of the estimated signal vector calculating units, that is, a total of $4(2^{N-1}+1)$ estimated signal vectors are output.

The signal determining unit 230 determines an estimated signal vector with the shortest distance to the real component vector input to the reception device (that is, the most probable estimated signal vector) from among all the estimated signal vectors calculated by the estimated signal vector calculating unit 220a, calculates the likelihood of the determined estimated signal vector, and outputs the calculated likelihood via the signal line s201a. For the likelihood calculation, an existing technique of calculating the probabilities of occurrence of 0 and 1 in the respective bits by using the shortest distances to the received signal vector can be used.

Note that the estimated signal vector calculating unit 220b that uses the imaginary component of the signal vector y has a configuration and functions substantially the same as the configuration and functions of the estimated signal vector calculating unit 220a described above. In the case of the estimated signal vector calculating unit 220b as well, the estimated signal vector calculating unit 220b calculates estimated signal vectors for the imaginary component of the signal vector y, the signal determining unit 230 determines an estimated signal vector with the shortest distance to the imaginary component vector input to the reception device, the signal determining unit 230 calculates the likelihood of the determined estimated signal vector, and the signal determining unit 230 outputs the calculated likelihood via the signal line s201b.

Here, a processing flow of the reception device 20 according to the present embodiment will be described with reference to FIG. 5.

Figure 5:
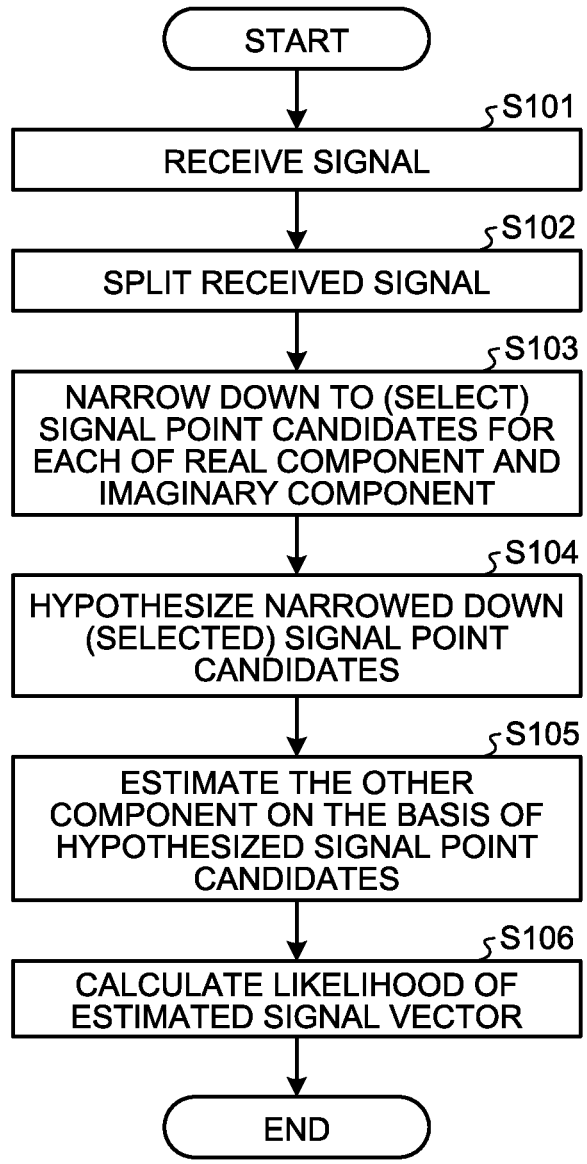
FIG. 5 is a flowchart illustrating an example of a process performed by the reception device according to the first embodiment of the present invention.

FIG. 5 is a flowchart illustrating an example of a process performed by the reception device 20 in the present embodiment.

First, the signal detecting unit 200 of the reception device 20 receives the received signal vector y via the signal lines s200a and s200b (step S101).

Upon receiving the received signal vector y, the signal splitting unit 210 of the signal detecting unit 200 splits complex baseband signals $y_1$ and $y_2$ of the received signal vector y into real components and imaginary components (step S102). The signal splitting unit 210 outputs a real component signal vector composed of the real component of the complex baseband signal $y_1$ input from the signal line s200a and the real component of the complex baseband signal $y_2$ input from the signal line s200b to the estimated signal vector calculating unit 220a, and outputs an imaginary component signal vector composed of the imaginary component of the signal $y_1$ input from the signal line s200a and the imaginary component of the signal $y_2$ input from the signal line s200b to the estimated signal vector calculating unit 220b.

When these signals are input, the candidate point selecting units of the estimated signal vector calculating units 220a and 220b each narrow down possible signal point candidates of a signal of one component of the modulated signal vector z multiplexed using a real number precoding matrix to signal point candidates, i.e., select signal point candidates from among possible signal point candidates, by the method described above (step S103).

Subsequently, the hypothesizing units of the estimated signal vector calculating units 220a and 220b each hypothesize a possible signal point candidate of a signal of one component of the multiplexed modulated signal vector z on the basis of the signal point candidates obtained by narrowing down (selection) performed by the candidate point selecting unit (step S104).

After the hypothesizing units each hypothesize a signal of one component of the multiplexed modulated signal vector z, the estimated value calculating units subsequent to the hypothesizing units each estimate a signal of the other component of the modulated signal vector z on the basis of the hypothesized signal point candidate (step S105).

After the estimated value calculating units perform the estimation process, the signal estimating units each output, to the signal determining unit 230, a hypothesized signal value and a signal value calculated on the basis of the hypothesized signal value. The signal determining unit 230 calculates the likelihoods of the estimated signal vectors by using the hypothesized signal values and the signal values calculated on the basis of the hypothesized signal values, the signal values being output from the respective signal estimating units (step S106).

The flow of the series of processes is terminated here.

As described above, in the present embodiment, signal demultiplexing is performed on each of the real component and the imaginary component of a received signal independently. In particular, in the signal demultiplexing, signal point candidates to be used in subsequent hypothesizing are selected from all the possible signal point candidates of a modulated signal multiplexed by a real number precoding matrix on the basis of the value of the received signal, and an estimated value of the other modulated signal (a signal to be estimated) is calculated by using the modulated signal hypothesized as being one of the selected signal point candidates, which enables reduction in the amount of computation while achieving signal demultiplexing characteristics equivalent to those of the MLD method.

Figure 3:
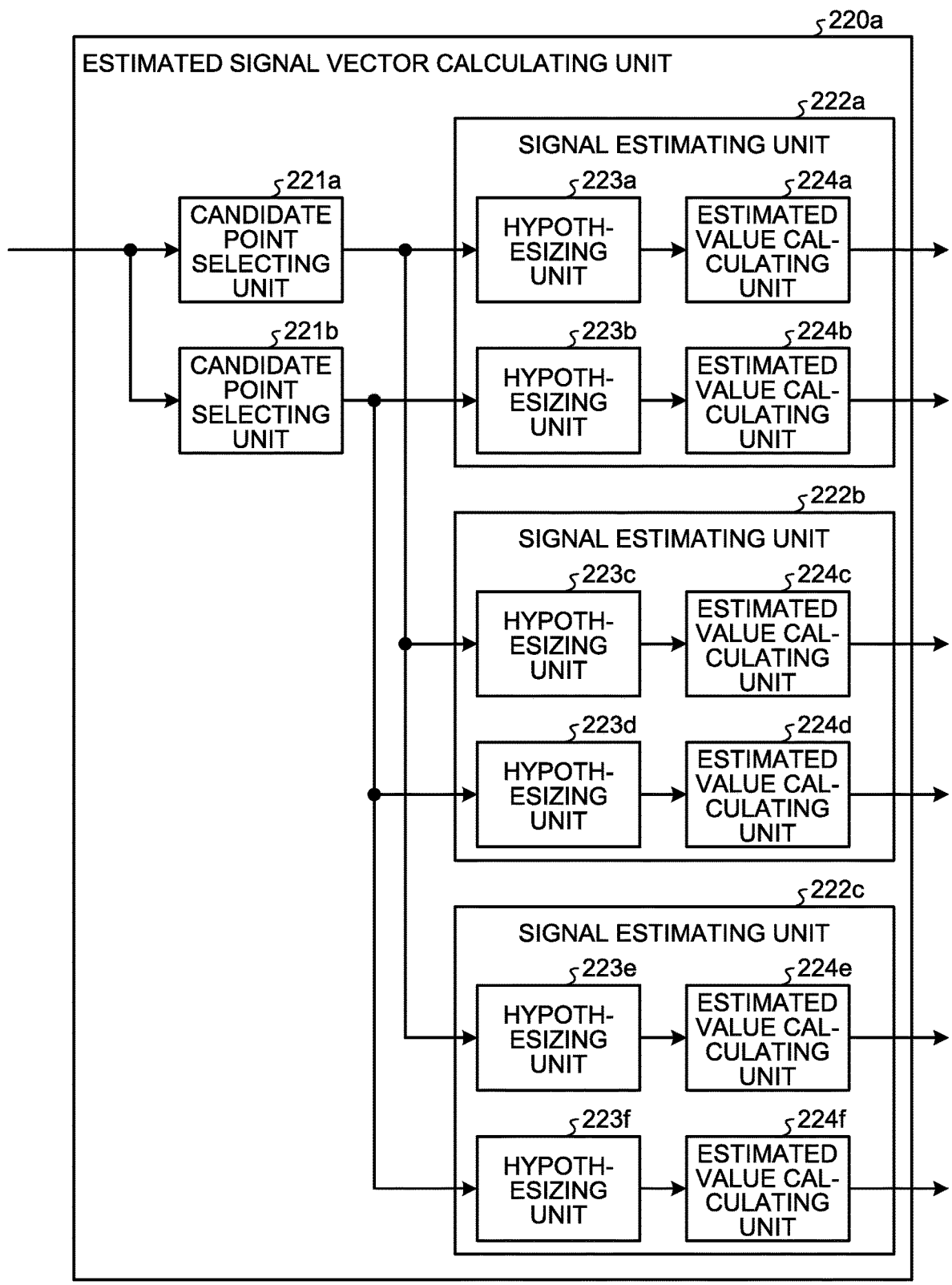
FIG. 3 is a diagram illustrating an example configuration of an estimated signal vector calculating unit according to the first embodiment of the present invention.

In addition, in a case where the highest possible modulation level corresponds to a $2^{2N}$-QAM technique (N is an integer of 2 or larger), the example configuration of the estimated signal vector calculating unit 220a illustrated in FIG. 3 may include $(2^{N-1}+1)$ signal detecting units.

As a result of including signal detecting units, the number of which corresponds to the highest possible modulation level, and using some or all of the signal detecting units depending on the modulation level as described above, an effect that one system can support various modulation levels is produced.

Figure 6:
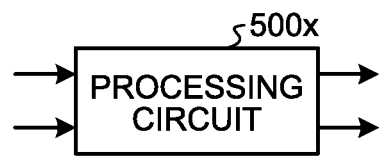
FIG. 6 is a diagram illustrating an example of a hardware configuration of the reception device according to the first embodiment of the present invention.
Figure 7:
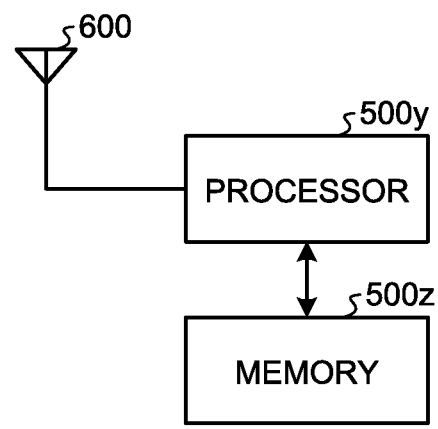
FIG. 7 is a diagram illustrating another example of a hardware configuration of the reception device according to the first embodiment of the present invention.

Examples of a hardware configuration of the reception device 20 according to the first embodiment are illustrated in FIGS. 6 and 7. In the example of FIG. 6, the functions of the reception device 20 (specifically, the functions of the signal splitting unit 210, the estimated signal vector calculating unit 220a and 220b, the signal determining unit 230, the candidate point selecting units 221a and 221b, the hypothesizing units 223a to 223f, and the estimated value calculating units 224a to 224f) are implemented by a processing circuit 500x. Specifically, the reception device includes the processing circuit 500x for performing processes of splitting signals, which are resulting from multiplexing of a plurality of modulated signals and input via propagation paths independent of each other, into real components and imaginary components, selecting signal point candidates to be used for hypothesizing from among all the possible signal points based on the value of the received signal for each of the components, performing hypothesizing on the selected signal point candidates, and calculating a signal estimated value of another modulated signal on the basis of the hypothesized signal point. The processing circuit 500x may be dedicated hardware or may be a central processing unit (CPU; also referred to as a central processor, a processing unit, a computing unit, a microprocessor, a microcomputer, a processor, or a DSP) that executes programs stored in a memory.

In a case where the processing circuit 500x is dedicated hardware, the processing circuit 500x is a single circuit, a composite circuit, a programmed processor, a parallel-programmed processor, an ASIC, an FPGA, or a combination thereof, for example. The functions of each of the signal splitting unit 210, the estimated signal vector calculating units 220a and 220b, the signal determining unit 230, the candidate point selecting units 221a and 221b, the hypothesizing units 223a to 223f, and the estimated value calculating units 224a to 224f may be implemented by different processing circuits, or the functions of the reception device may be implemented collectively by the processing circuit 500x.

In the example of FIG. 7, the processing circuit is a CPU (a processor 500y). In this case, the functions of the reception device (specifically, the functions of the signal splitting unit 210, the estimated signal vector calculating unit 220a and 220b, the signal determining unit 230, the candidate point selecting units 221a and 221b, the hypothesizing units 223a to 223f, and the estimated value calculating units 224a to 224f) are implemented by software, firmware, or a combination of software and firmware. The software and firmware are described in the form of programs and stored in a memory 500z. The processing circuit (processor 500y) implements the functions of the respective components by reading and executing the programs stored in the memory 500z. In other words, these programs cause a computer to execute the procedures and the methods of the reception device (specifically, the functions of the signal splitting unit 210, the estimated signal vector calculating unit 220a and 220b, the signal determining unit 230, the candidate point selecting units 221a and 221b, the hypothesizing units 223a to 223f, and the estimated value calculating units 224a to 224f). Note that the memory 500z is a volatile or nonvolatile semiconductor memory such as a RAM, a ROM, a flash memory, an EPROM, or an EEPROM, a magnetic disk, a flexible disk, an optical disk, a compact disc, a mini disc, a DVD, or the like, for example.

Alternatively, some of the functions of the reception device (specifically, the signal splitting unit 210, the estimated signal vector calculating unit 200a and 200b, the signal determining unit 230, the candidate point selecting units 221a and 221b, the hypothesizing units 223a to 223f, and the estimated value calculating units 224a to 224f) may be implemented by dedicated hardware, and the others may be implemented by software or firmware. For example, the functions of the estimated signal vector calculating units 220a and 220b can be implemented by a processing circuit that is dedicated hardware, and the functions of the signal determining unit 230 can be implemented by the processing circuit reading and executing programs stored in a memory.

In addition, the processor 500y receives signals via an antenna 600 and performs the processes described above thereon. The antenna 600 thus functions as the reception unit.

As described above, the processing circuit is capable of implementing the above-described functions by hardware, software, firmware, or combination thereof.

Second Embodiment

While the signals input to the reception device illustrated in FIG. 1 are modulated by the 16 QAM technique in the first embodiment, a case where the modulation method is a $2^{2N}$-QAM technique (N is an integer of 3 or larger) will be described in the present embodiment, which further reduces the amount of computation. Herein, for simplicity of explanation, a case where the number L of signals multiplexed by a precoding matrix is L=2 and the signals are multiplexed by the 64 QAM (N=3) technique will be described. Note that differences from the first embodiment will be described in the present embodiment, and redundant description overlapping with the description in the first embodiment will not be repeated.

Figure 2:
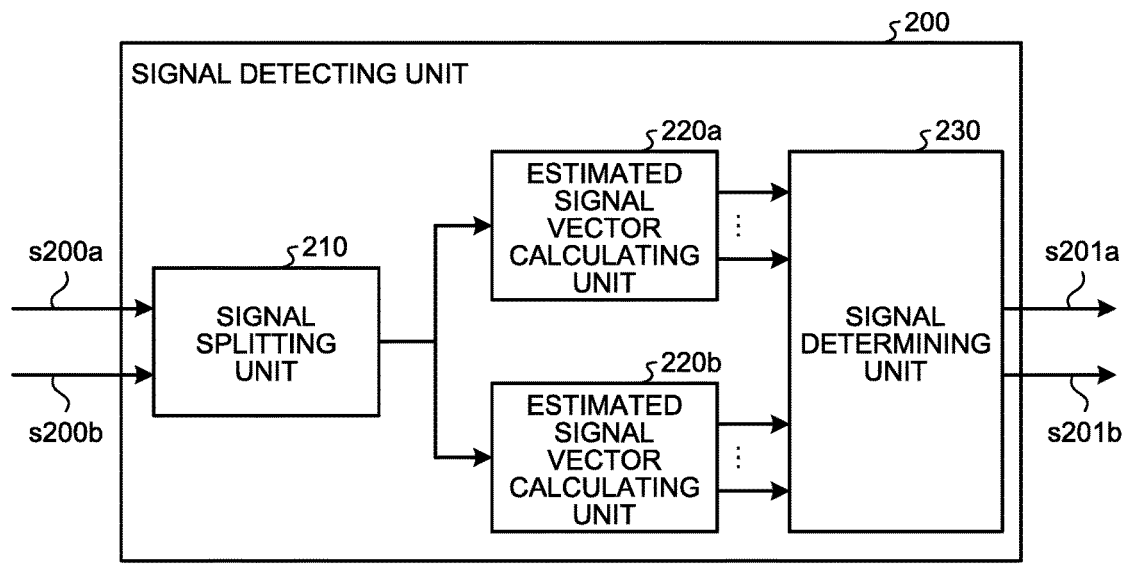
FIG. 2 is a diagram illustrating an example configuration of a reception device according to the first embodiment of the present invention.

While the number of signal lines input to the signal determining unit 230 is $12(=4(2^{N-2}+1))$ in the example configuration of the reception device of the first embodiment illustrated in FIG. 2, the number of such signal lines is $16(=4(N+1))$ in an example configuration of a reception device of the second embodiment according to the present invention.

The configuration of the communication system 1 and the configuration of the signal detecting unit 200 in the present embodiment are as illustrated in FIGS. 1 and 2, respectively, except that the number of signal lines input to the signal determining unit 230 and the configurations of the inside of the estimated signal vector calculating units 220a and 220b in FIG. 2 are different from the first embodiment.

Figure 8:
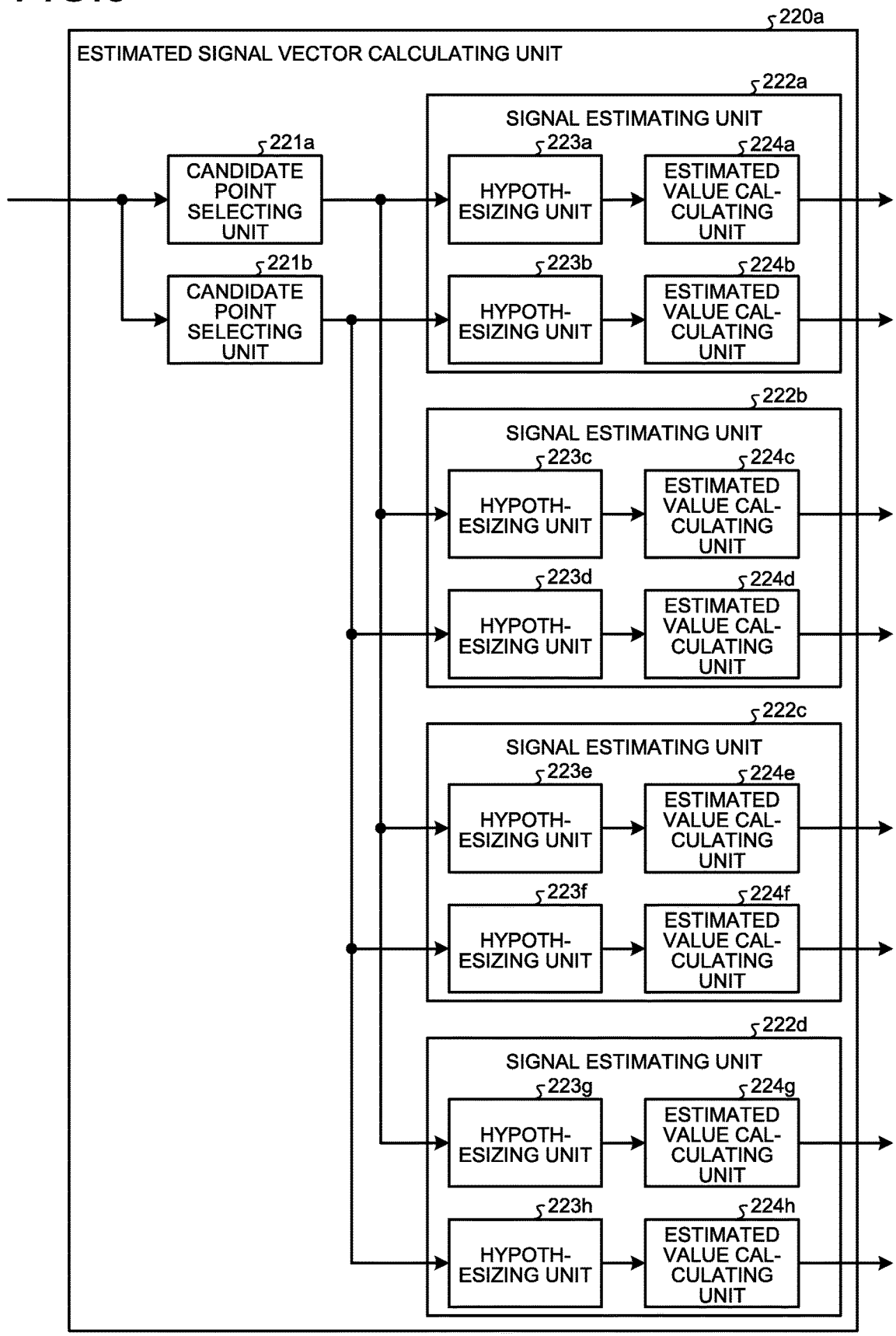
FIG. 8 is a diagram illustrating an example configuration of an estimated signal vector calculating unit according to a second embodiment of the present invention.

FIG. 8 is a block diagram illustrating an example of an internal configuration of an estimated signal vector calculating unit according to the present embodiment.

An example configuration of the estimated signal vector calculating unit 220a in the second embodiment according to the present invention will be described with reference to FIG. 8. While the number of signal estimating units 222a to 222c is three in the example configuration of the estimated signal vector calculating unit 220a in the first embodiment, the number of signal estimating units is four in the present embodiment. Thus, the estimated signal vector calculating unit 220a in the present embodiment includes two candidate point selecting units 221a and 221b and four signal estimating units 222a to 222d. The signal estimating unit 222a includes two hypothesizing units 223a and 223b and two estimated value calculating units 224a and 224b, the signal estimating unit 222b includes two hypothesizing units 223c and 223d and two estimated value calculating units 224c and 224d, the signal estimating unit 222c includes two hypothesizing units 223e and 223f and two estimated value calculating units 224e and 224f, and the signal estimating unit 222d includes two hypothesizing units 223g and 223h and two estimated value calculating units 224g and 224h.

Next, specific operation will be explained.

A modulated signal vector z is multiplexed by a real number precoding matrix, and signals transmitted via propagation paths orthogonal to each other are input to the reception device 20. Herein, a case where a vector (real component vector) composed of the real component of the signal vector y input to the reception device 20 is input to the estimated signal vector calculating unit 220a will be described. First, the candidate point selecting units 221a and 221b select signal point candidates to be used by the subsequent hypothesizing units 223a to 223h from among all the possible signal point candidates of the real component $Re(z_1)$ or $Re(z_2)$ of the modulated signal on the basis of the real component $Re(y)$ of the received signal vector. In the present embodiment, since the case where the 64 QAM technique is applied as the modulation method for the modulated signals $z_1$ and $z_2$ is presented, all the possible signal point candidates of each of the real components $Re(z_1)$ and $Re(z_2)$ of the modulated signals are eight signal point candidates (010, 011, 001, 000, 100, 101, 111, 110).

Figure 9:
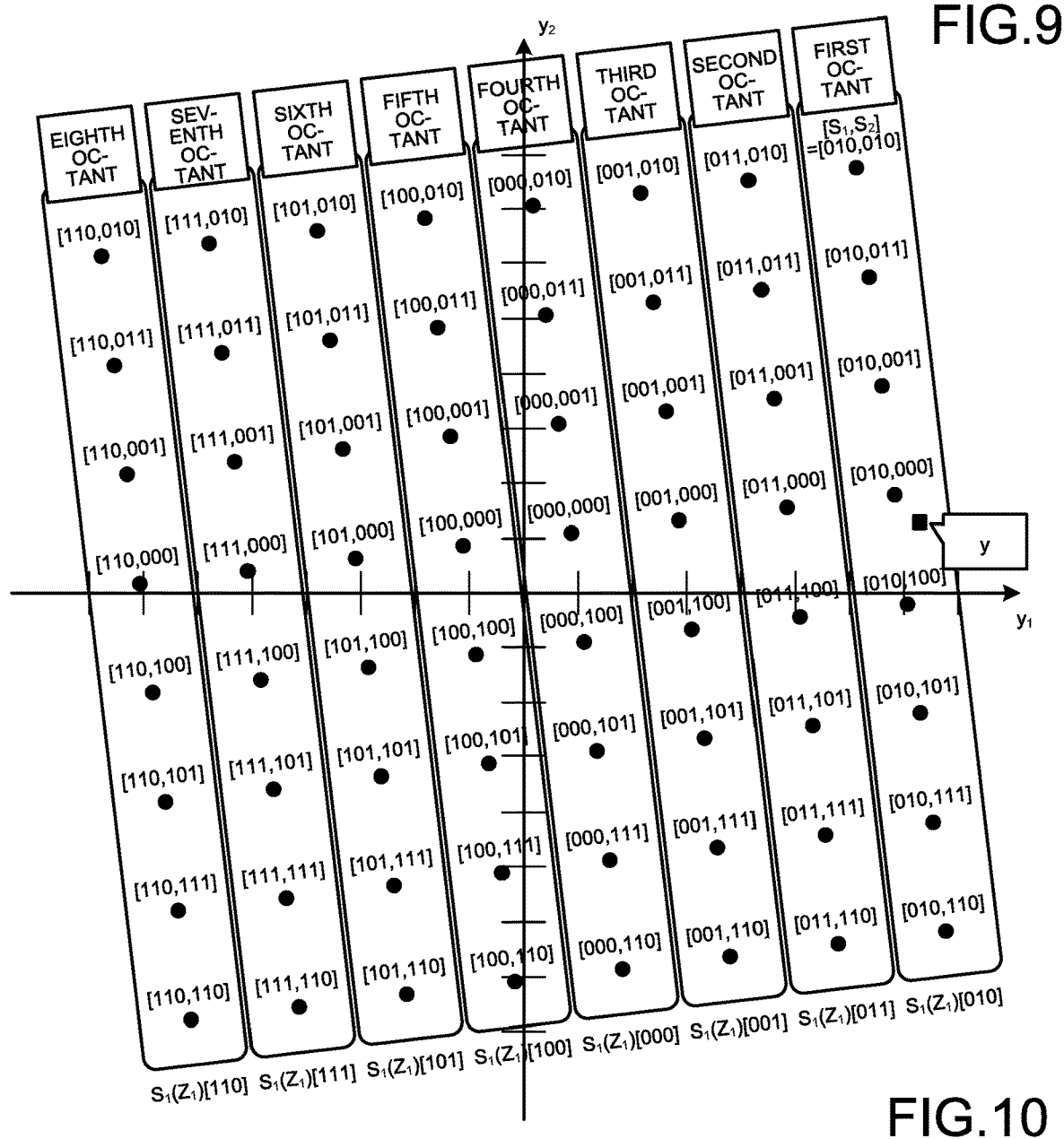
FIG. 9 is a diagram illustrating signal point arrangement of a real component of a received signal according to the second embodiment of the present invention.

FIG. 9 illustrates signal point arrangement where the horizontal axis represents the real component $Re(y_1)$ of the received signal and the vertical axis represents the real component $Re(y_2)$ of the received signal. In addition, as illustrated by solid lines in FIG. 9, in the signal point arrangement diagram constituted by the real components $Re(y_1)$ and $Re(y_2)$ of the received signals, a region in which the signal point candidate that is closest to the real component $Re(y)$ of the received signal vector is 010 among the signal point candidates of the real component modulated signal $Re(z_1)$ is a first octant of the signal $z_1$, a region in which such a signal point candidate is 011 is a second octant of the signal $z_1$, a region in which such a signal point candidate is 001 is a third octant of the signal $z_1$, . . . , a region in which such a signal point candidate is 111 is a seventh octant of the signal $z_1$, and a region in which such a signal point candidate is 110 is an eighth octant of the signal $z_1$. This allocation of the octants can be calculated on the basis of the arrangement of the signal point candidates, similarly to the first embodiment. For example, the calculation can be performed by using the slope of a line connecting the signal point candidates where the real component $Re(z_1)$ is (010) and/or the distances between the candidate points where the real component $Re(z_1)$ is (010) and the candidate points where the real component $Re(z_1)$ is (011), for example. Alternatively, the calculation need not be performed here by the candidate point selecting unit 221a, but may be performed by the transmission device 10 and the calculated region information may be shared.

The candidate point selecting unit 221a selects, from among the signal point candidates of the real component modulated signal $Re(z_1)$, a signal point candidate associated with an octant in which the real component $Re(y)$ of the received signal vector is present and signal point candidates in the octants that are closest to the real component $Re(y)$ of the received signal vector among the octants associated with an inverted bit with respect to each bit of the selected signal point candidate. Thus, in a case where the real component $Re(y)$ of the received signal vector is present in the first octant of the signal $z_1$ as illustrated in FIG. 9, the candidate point selecting unit 221a selects the signal point candidate (010) in the first octant in which the real component $Re(y)$ of the received signal vector is present, and selects the signal point candidates (011, 001, 100) in the second, third, and fifth octants that are closest to the first octant among the octants associated with an inverted bit with respect to each bit of the selected signal point candidate. In a similar manner, in a case where the real component $Re(y)$ of the received signal vector is present in the second octant, the signal point candidates in the second octant and the first, third, and fifth octants are selected, and in a case where the real component $Re(y)$ of the received signal vector is present in the third or fourth octant, the signal point candidates in the third and fourth octants and the second and fifth octants are selected. In a case where the real component $Re(y)$ of the received signal vector is present in the fifth or sixth octant, the signal point candidates in the fifth and sixth octants and the fourth and seventh octants are selected, and in a case where the real component $Re(y)$ of the received signal vector is present in the seventh or eighth octant, the signal point candidates in the seventh and eighth octants and the fourth and sixth octants are selected.

In a similar manner, in a case where signals to be multiplexed using a real number precoding matrix are modulated by a $2^{2N}$-QAM technique (N is an integer of 3 or larger), that is, in a case where each of the real component and the imaginary component of signals is expressed by $2^N$ signal point candidates, a total of (N+1) signal point candidates including a signal point candidate in the octant of the modulated signal $z_1$ or $z_2$ in which the real component $Re(y)$ of the received signal vector is present and signal point candidates in the octants that are closest to the real component $Re(y)$ of the received signal vector among the octants in which an inverted bit with respect to each bit of the signal point candidate in the octant in which the real component $Re(y)$ is present are selected by the candidate point selecting units 221a and 221b as signal point candidates to be used by the hypothesizing units from among all the possible signal point candidates of the real component $Re(z_1)$ or $Re(z_2)$ of a modulated signal.

Hereinafter, a case where the real component $Re(y)$ of the received signal vector is present in the first octant and the candidate point selecting unit 221a selects 010, 011, 001, and 100 as the signal point candidates of the modulated signal $z_1$ to be used by the hypothesizing unit 223a, for example, will be described.

As described above, in the case where the signals multiplexed using the real number precoding matrix are modulated by the 64 QAM, the candidate point selecting unit 221a selects 010, 011, 001, and 100 as the signal point candidates to be used by the hypothesizing units 223a, 223c, 223e, and 223g from among the possible signal point candidates of the signal $z_1$ on the basis of the value of the real component $Re(y)$ of the received signal vector. In a similar manner, the candidate point selecting unit 221b selects the signal point candidates to be used by the hypothesizing units 223b, 223d, 223f, and 223h from among the possible signal point candidates of the signal $z_2$ on the basis of the value of the real component $Re(y)$ of the received signal vector.

The hypothesizing unit 223a hypothesizes 010 that is the signal point candidate of the signal $z_1$ selected by the candidate point selecting unit 221a, and the estimated value calculating unit 224a calculates an estimated value of the other signal by using the hypothesized signal. In a similar manner, the hypothesizing units 223b to 223h each hypothesize one signal point candidate from among the signal point candidates of the signal $z_1$ or $z_2$ selected by the candidate point selecting unit 221a or 221b, and the estimated value calculating units 224b to 224h each calculate an estimated value of the other signal by using the hypothesized signal.

In the present embodiment, since the 64 QAM technique is applied, eight estimated signal vectors are output from each of the estimated signal vector calculating units, that is, a total of 16 estimated signal vectors are output. In a similar manner, in a case where a $2^{2N}$-QAM technique (N is an integer of 3 or larger) is applied, 2(N+1) estimated signal vectors are output from each of the estimated signal vector calculating units, that is, a total of 4(N+1) estimated signal vectors are output.

As described above, in the present embodiment, in the case where signals multiplexed using a real number precoding matrix are modulated by a $2^{2N}$-QAM technique (N is an integer of 3 or larger), a signal point candidate in an orthant in which a received signal vector is present and signal point candidates in orthants that are closest to the received signal vector among orthants associated with signal point candidates including an inverted bit with respect to each bit of the signal point candidate are selected as the signal point candidates to be used in subsequent hypothesizing, which enables reduction in the amount of computation while achieving signal demultiplexing characteristics equivalent to those of the MLD method when the modulation level is high. In addition, in the example configuration of the estimated signal vector calculating unit 220a illustrated in FIG. 8, as a result of including (N+1) signal detecting units when the highest possible modulation level corresponds to a $2^{2N}$-QAM technique (N is an integer of 3 or larger), and using some or all of the signal detecting units depending on the modulation level, one system can support various modulation levels.

In addition, while the signal point candidate in the orthant in which the real component $Re(y)$ of the received signal vector is included and the signal point candidates in the orthants that are closest to the aforementioned orthant among orthants associated with signal point candidates including an inverted bit with respect to each bit of the signal point candidate in the aforementioned orthant are selected as signal point candidates for hypothesizing in the present embodiment, the selected signal point candidates are not limited to the above, but a signal point associated with the closest orthant among orthants that are not selected under the above-described conditions may additionally be selected as a hypothesized candidate. In the above-described case, a signal point (000) associated with the fourth octant that is closest to the first octant among the unselected octants may be selected in addition to the first, second, third, and fifth octants, before the hypothesizing and subsequent processes. In this case, the number of signal estimating units is further increased by one, but the number of signals input to the signal determining unit 230 is increased, which enables a more accurate signal demultiplexing process.

In addition, the hardware configuration of the signal detecting units according to the second embodiment can also be achieved as illustrated in FIG. 6 or 7 similarly to the first embodiment.

Third Embodiment

While the signals input to the reception device 20 illustrated in FIG. 1 are multiplexed by a precoding matrix with the number L of multiplexed signals being L=2 in the first embodiment, a case where the number L of multiplexed signals is three or larger will be described in the present embodiment. Herein, the case of L=3 will be described, but the present invention is not limited thereto, and the number L of multiplexed signals may be any number that is an integer equal to or larger than 3. In addition, a case where radio signals multiplexed using a precoding matrix are modulated by the 16 QAM technique will be described. The present invention, however, is not limited to this, and is applicable to cases where complex baseband signals are modulated by a $2^{2N}$-QAM technique (N is an integer of 2 or larger).

Figure 10:
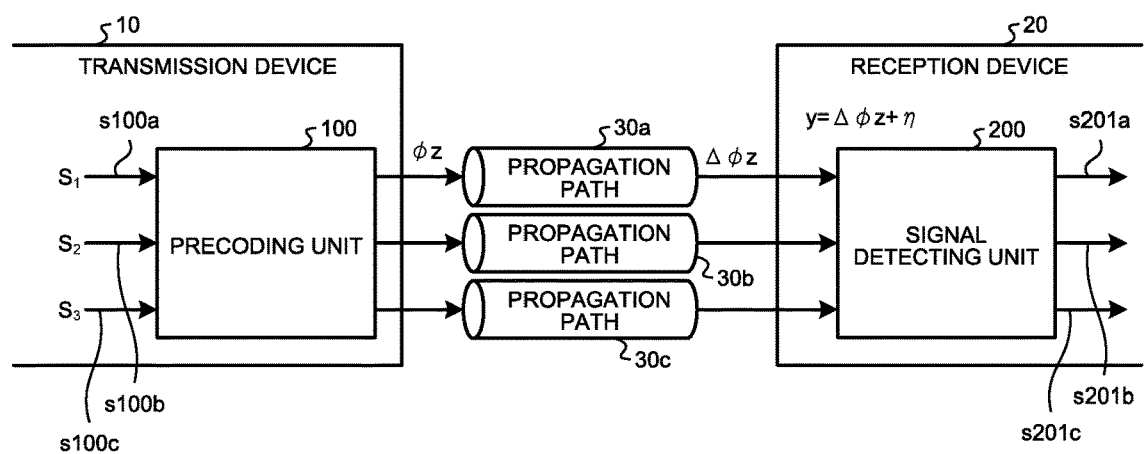
FIG. 10 is a diagram illustrating an example configuration of a communication system according to a third embodiment of the present invention.
Figure 11:
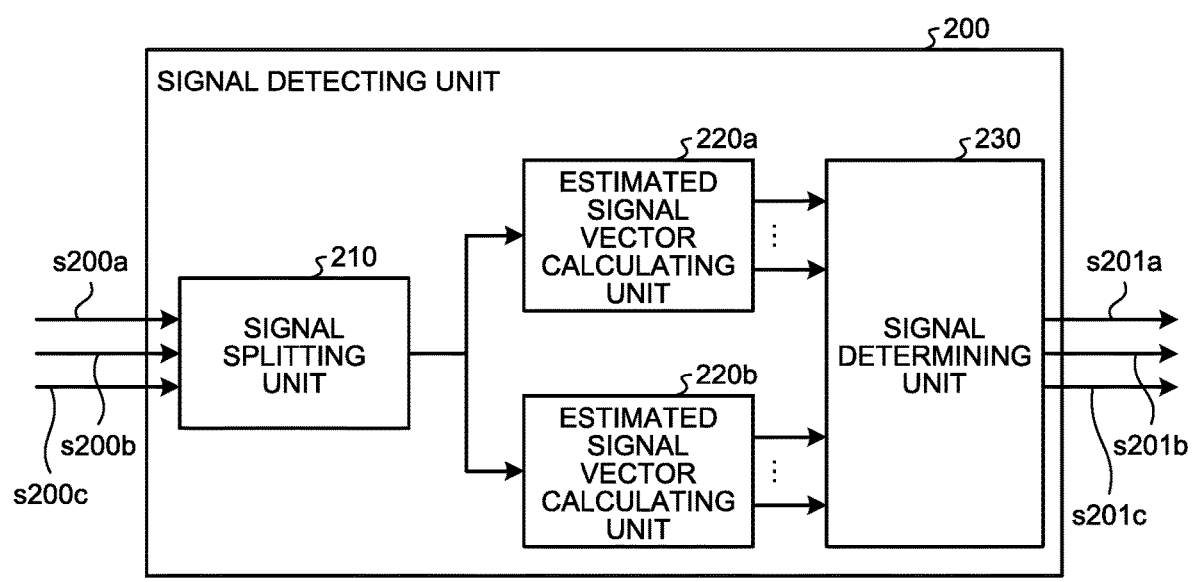
FIG. 11 is a diagram illustrating an example configuration of a reception device according to the third embodiment of the present invention.

An example configuration of the communication system 1 according to the third embodiment of the present invention is illustrated in FIG. 10, and an example configuration of the reception device 20 of the communication system 1 is illustrated in FIG. 11. The difference between the communication system 1 of the first embodiment illustrated in FIGS. 1 and 2 and the present embodiment lies in the number of multiplexed signals (L=3 in the present embodiment). Specifically, reception signal lines to the precoding unit 100 of the transmission device 10 are s100a, s100b, and s100c, reception signal lines to the signal splitting unit 210 of the reception device 20 are s200a, s200b, and s200c, and output signal lines from the signal determining unit 230 are s201a, s201b, and s201c.

Figure 12:
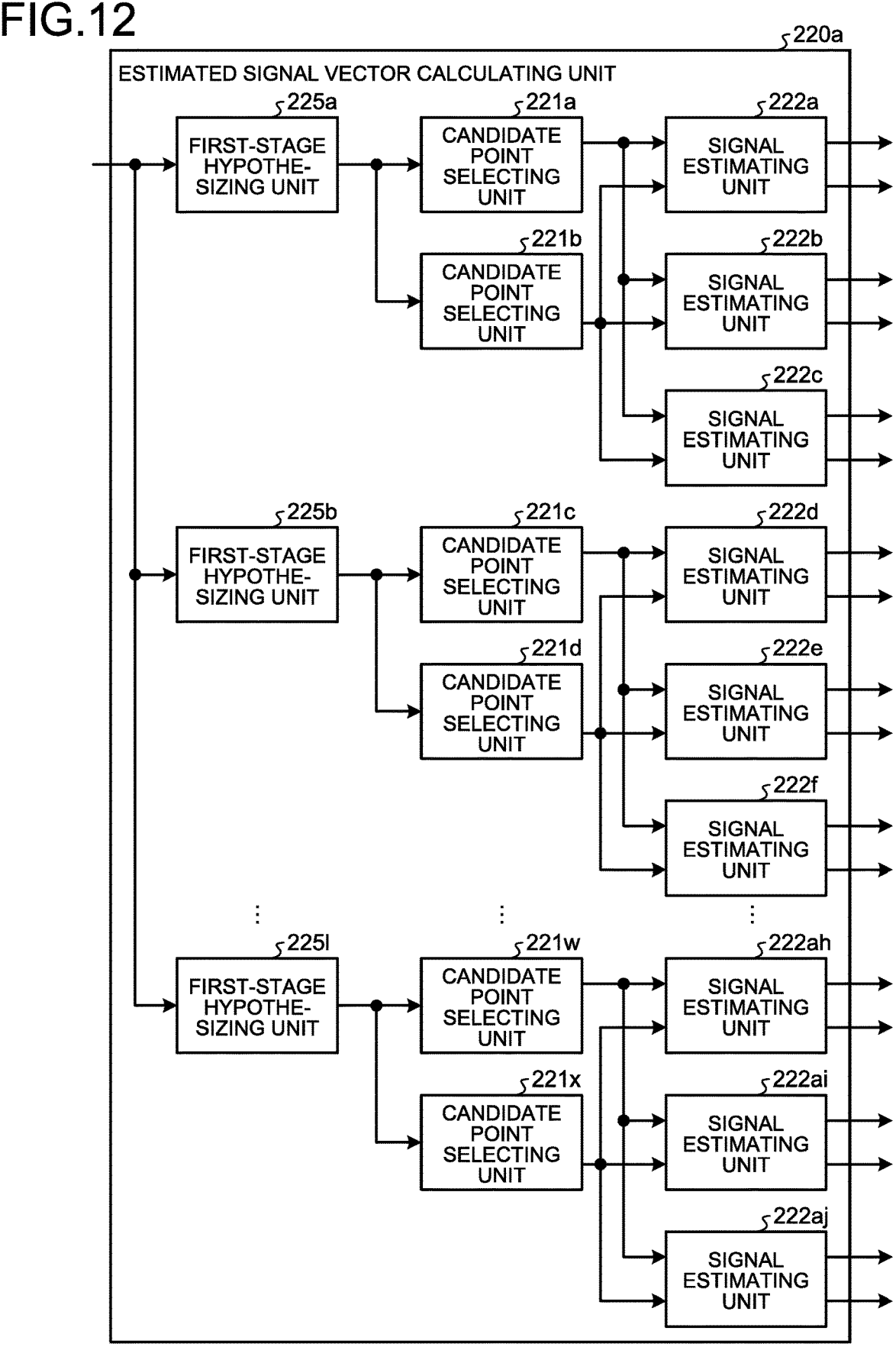
FIG. 12 is a diagram illustrating an example configuration of an estimated signal vector calculating unit according to the third embodiment of the present invention.
Figure 13:
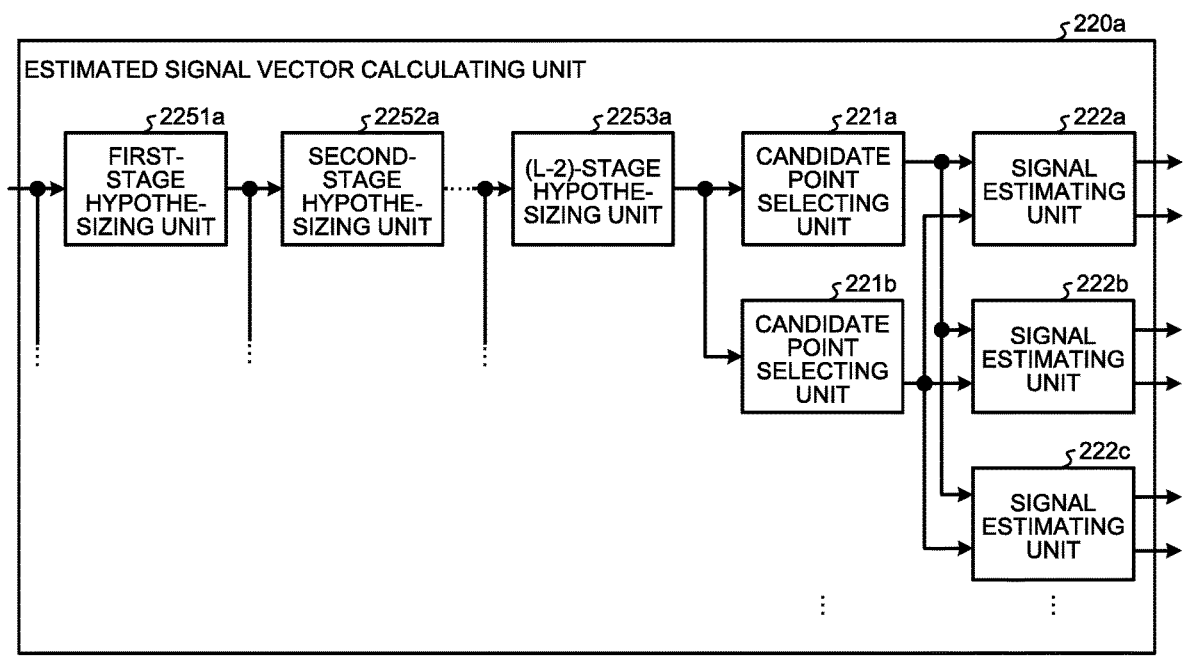
FIG. 13 is a diagram illustrating an example configuration of an estimated signal vector calculating unit according to the third embodiment of the present invention.

The internal configurations of the estimated signal vector calculating units 220a and 220b are different from the internal configurations in the first embodiment. An example configuration of the estimated signal vector calculating unit 220a of the third embodiment will be described with reference to FIG. 12. The estimated signal vector calculating unit 220a in the third embodiment includes 12 first-stage hypothesizing units 225a to 225l, 24 candidate point selecting units 221a to 221x, and 36 signal estimating units 222a to 222aj. Note that, in the case where the number L of signals multiplexed using a real number precoding matrix is 3 or larger (L=3 in the present embodiment), a group of (L-2)-stage hypothesizing units are included before the candidate point selecting units as illustrated in FIG. 13, and each stage of the group of hypothesizing units hypothesizes either the real component or the imaginary component of a different modulated signal.

Figure 14:
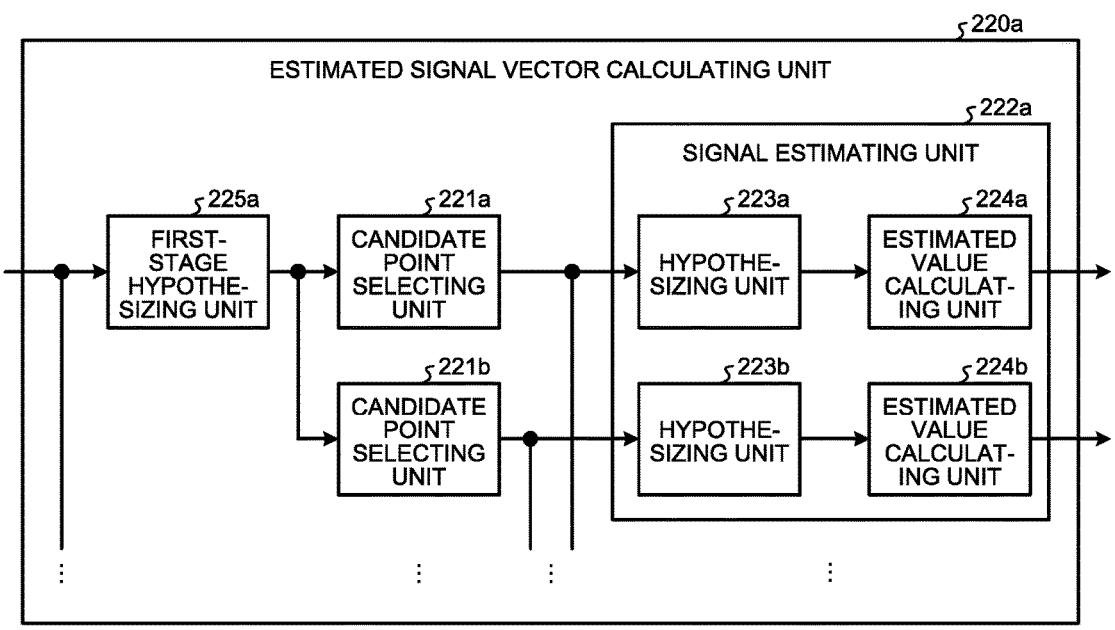
FIG. 14 is a diagram illustrating an example configuration of an estimated signal vector calculating unit according to the third embodiment of the present invention.

Example configurations of the first-stage hypothesizing unit 225a, the candidate point selecting units 221a and 221b, and the signal estimating unit 222a of the third embodiment will be described with reference to FIG. 14. The signal estimating unit 222a of the third embodiment includes two second-stage hypothesizing units 223a and 223b and two estimated value calculating units 224a and 224b. In a similar manner to the first and second embodiments, an estimated signal vector composed of a signal hypothesized as one of the signal point candidates and a signal estimated on the basis of the hypothesized signal is output from the estimated signal vector calculating unit 220a.

Next, specific operation will be explained.

A modulated signal vector z is multiplexed by the real number precoding matrix, and signals transmitted via propagation paths orthogonal to each other are input from the transmission device 10 to the reception device 20. The modulated signal vector z is an n-dimensional complex vector composed of complex baseband signals $z_1$, $z_2$, and $z_3$, n being equal to the number of multiplexed signals (L=3 in the present embodiment). The signal vector y input to the reception device 20 is an n-dimensional complex vector composed of complex baseband signals $y_1$, $y_2$, and $y_3$, n being equal to the number of propagation paths (three in the present embodiment) orthogonal to each other. The received signal vector y is expressed by the following formula using the equivalent channel matrix H composed of the real number precoding matrix $\phi$ by which the modulated signal vector z is multiplied in the transmission device 10 and the transfer function matrix $\Delta$ of the propagation paths estimated in the reception device 20 or in a device that is not illustrated, the modulated signal vector z, and the noise vector $\eta$ added at the input terminal of the reception device 20.

$$y = \Delta \phi z + \eta \qquad (9)$$

$$= \begin{bmatrix} \Delta_1 & 0 & 0 \\ 0 & \Delta_2 & 0 \\ 0 & 0 & \Delta_3 \end{bmatrix} \begin{bmatrix} \phi_{11} & \phi_{12} & \phi_{13} \\ \phi_{21} & \phi_{22} & \phi_{23} \\ \phi_{31} & \phi_{32} & \phi_{33} \end{bmatrix} \begin{bmatrix} z_1 \\ z_2 \\ z_3 \end{bmatrix} + \eta$$

$$= Hz + \eta$$

$$= [\, h_1 \quad h_2 \quad h_3 \,] \begin{bmatrix} z_1 \\ z_2 \\ z_3 \end{bmatrix} + \eta$$

An equivalent channel vector $h_1$ represents a vector component corresponding to the received signal $y_1$ in the equivalent channel matrix H, an equivalent channel vector $h_2$ represents a vector component corresponding to the received signal $y_2$ in the equivalent channel matrix H, and an equivalent channel vector $h_3$ represents a vector component corresponding to the received signal $y_3$ in the equivalent channel matrix H. The signal vector y input to the reception device 20 is input to the signal splitting unit 210. The signal splitting unit 210 splits the received signal vector y into the real component and the imaginary component, and outputs signal vectors composed of the respective components toward the respective estimated signal vector calculating units 220a and 220b.

Herein, a case where a vector (real component vector) composed of the real component of the received signal vector y is input to the estimated signal vector calculating unit 220a will be described. First, the first-stage hypothesizing units 225a to 225l each hypothesize one of all the possible signal point candidates of the modulated signal $z_1$, $z_2$, or $z_3$. In the present embodiment, since the case where the 16 QAM technique is applied as the modulation method for the modulated signals $z_1$, $z_2$, and $z_3$ is presented, the possible signal point candidates of each of the modulated signals $z_1$, $z_2$, and $z_3$ are four signal point candidates (01, 00, 10, 11).

In the following, a case where the first-stage hypothesizing unit 225a hypothesizes the modulated signal as 11 among the possible signal point candidates (01, 00 10, 11) will be described as an example. The following formula is obtained by subtracting the hypothesized signal $z_3$(with hat) and the equivalent channel vector $h_3$ associated with the hypothesized signal from the real component Re(y) of the received signal vector.

$$Re(y - h_3\hat{z}_3) = Re(Hz - h_3\hat{z}_3 + \eta) \quad (10)$$
$$= Re\{h_1 z_1 + h_2 z_2 + h_3(z_3 - \hat{z}_3) + \eta\}$$
$$= Re(y')$$

When the signal $z_3$(with hat) hypothesized as being 11 is assumed to be equal to the real component Re($z_3$) of the modulated signal input from any of s200a to s200c, only the $z_1$ component of the first term, the $z_2$ component of the second term, and the noise component of the fourth term remain on the right side on the second line of the above formula. On this basis, the candidate point selecting units 221a and 221b select signal point candidates to be used by the second-stage hypothesizing units 223a and 223b from among all the possible signal point candidates. The candidate point selecting units 221a and 221b select the signal point candidates by a method similar to the method in the first embodiment or the second embodiment.

Hereinafter, a case where the real component Re(y') of the received signal vector in the candidate point selecting unit 221a is present in the third quadrant of the real component modulated signal $z_2$, and the candidate point selecting unit 221a selects 00, 10, and 11 as the signal point candidates of the real component modulated signal $z_2$ to be used by the second-stage hypothesizing unit 223a will be described. The second-stage hypothesizing unit 223a hypothesizes 00 among the signal point candidates (00, 10, 11) selected by the candidate point selecting unit 221a. The following formula is obtained by subtracting the modulated signal $z_2$(with hat) hypothesized from the real component Re(y') of the received signal vector and the estimated equivalent channel vector $h_2$ associated with the hypothesized signal from the real component Re(y') of the received signal vector.

$$Re(y'-h_2\hat{z}_2)=Re\{h_1 z_1+h_2(z_2-\hat{z}_2)+h_3(z_3-\hat{z}_3)+\eta\} \quad (11)$$

When the modulated signal $z_3$(with hat) hypothesized as being 11 by the first-stage hypothesizing unit 225a is assumed to be equal to the real component Re($z_3$) of the modulated signal input from any of s200a to s200c and the modulated signal $z_2$(with hat) hypothesized as being 00 by the second-stage hypothesizing unit 223a is assumed to be equal to the real component Re($z_2$) of the modulated signal input from any of s200a to s200c, only the modulated signal $z_1$ component of the first term and the noise component of the fourth term remain on the right side of formula (11). On this basis, the estimated value calculating unit 224a calculates an estimated value $z_1$(with acute) of the modulated signal $z_2$ by using the following formula (12), and outputs an estimated signal vector z(with acute) composed of the modulated signal $z_3$(with hat) hypothesized by the first-stage hypothesizing unit 225a and the modulated signal $z_2$(with hat) hypothesized by the second-stage hypothesizing unit 223a.

$$\acute{z}_1 = \frac{Re\{h_1^H(y - h_2\hat{z}_2 - h_3\hat{z}_3)\}}{\|h_1\|^2} \quad (12)$$

As described above, the first-stage hypothesizing units 225a hypothesizes the real component modulated signal Re($z_3$) as 11 among the possible signal point candidates 01, 00, 10, and 11, and calculates a value obtained by subtracting the hypothesized modulated signal and the equivalent channel vector $h_3$ associated with the hypothesized modulated signal from the real component Re(y) of the received signal vector. In a similar manner, the first-stage hypothesizing units 225b to 225l each hypothesize the modulated signal $z_1$, $z_2$, or $z_3$ as one of possible signal point candidates, and calculate a value obtained by subtracting the hypothesized modulated signal and the equivalent channel vector associated with the hypothesized modulated signal from the received signal vector.

As described above, the candidate point selecting unit 221a selects 00, 10, and 11 as signal point candidates to be used by the second-stage hypothesizing unit 223a from all the possible signal point candidates of the real component modulated signal Re($z_2$) on the basis of the value of the real component Re(y') of the received signal vector. In a similar manner, the candidate point selecting units 221b to 221x select signal point candidates to be used by the second-stage hypothesizing units 223a to 223bc from all the possible signal point candidates of the modulated signal $z_1$, $z_2$, or $z_3$ on the basis of the value of the real component Re(y') of the received signal.

As described above, the second-stage hypothesizing unit 223a hypothesizes 00 as the modulated signal $z_2$ from among signal point candidates 00, 10, and 11 selected by the candidate point selecting unit 221a, and the subsequent estimated value calculating unit 224a calculates an estimated value of the remaining one modulated signal $z_1$ by using the hypothesized signal. In a similar manner, the second-stage hypothesizing units 223b to 223bc hypothesize one of the signal point candidates selected by the candidate point selecting units 221a to 221x as the modulated signal $z_1$, $z_2$, or $z_3$, and the estimated value calculating units 224a to 224bc calculate an estimated value of the remaining one modulated signal $z_1$, $z_2$, or $z_3$ by using the hypothesized signal.

In the present embodiment, since signals obtained by multiplexing signals modulated by the 16 QAM technique using a real number precoding matrix with the number L of multiplexed signals being L=3 are input, 72 estimated signal vectors are output from each of the estimated signal vector calculating units, that is, a total of 144 estimated signal vectors are output. In a similar manner, in a case where signals obtained by multiplexing signals modulated by a $2^{2N}$-QAM technique (N is an integer of 2 or larger) using a precoding matrix with the number L of multiplexed signals are input, $(2^{N(L-1)}L(L-1)(1+2^{N-1})/2)$ estimated signal vectors are output from each of the estimated signal vector calculating units, that is, a total of $(2^{N(L-1)}L(L-1)(1+2^{N-1}))$ estimated signal vectors are output. Each estimated signal vector is determined depending on: whether the estimated signal vector corresponds to a real component or an imaginary component vector (two kinds); which of L signals is a signal to be estimated (in other words, which (L−1) signals among L signals are hypothesized) (L kinds); which of (L−1) signals to be hypothesized is a signal to be selected by a candidate point selecting unit ((L−1) kinds); which signal point candidate is hypothesized as a selected signal (($2^{N-1}$+1) kinds); and which signal point candidate is hypothesized as a signal to be hypothesized other than the selected signal ($2^N$ kinds for each of (L−2) signals; a total of $2^{N(L-2)}$ kinds). In particular, in a case where signals obtained by multiplexing signals modulated by a $2^{2N}$-QAM technique (N is an integer of 3 or larger) using a precoding matrix with the number L of multiplexed signals are input, ($2^{N(L-2)}$L(L−1)(N+1)) estimated signal vectors are output from each of the estimated signal vector calculating units, that is, a total of ($2^{N(L-2)+1}$L(L−1)(N+1)) estimated signal vectors are output. Each estimated signal vector is determined depending on: whether the estimated signal vector corresponds to a real component or an imaginary component vector (2 kinds); which of L signals is a signal to be estimated (in other words, which (L−1) signals among L signals are hypothesized) (L kinds); which of (L−1) signals to be hypothesized is a signal to be selected by a candidate point selecting unit ((L−1) kinds); which signal point candidate is hypothesized as a selected signal ((N+1) kinds); and which signal point candidate is hypothesized as a signal to be hypothesized other than the selected signal ($2^N$ kinds for each of (L−2) signals; a total of $2^{N(L-2)}$ kinds).

As described above, in the present embodiment, in the case where three or more signals are multiplexed using a real number precoding matrix, signal demultiplexing is performed on each of the real component and the imaginary component of a received signal, which is a received signal, independently. In particular, in the signal demultiplexing, signal point candidates to be used in subsequent hypothesizing are selected from all the possible signal point candidates of a received signal on the basis of the value of the received signal, and an estimated value of one signal to be estimated is calculated by using a combination consisting of a signal hypothesized as being one of the selected signal point candidates and a plurality of signals hypothesized as being one of all the possible signal point candidates, which enables reduction in the amount of computation while achieving signal demultiplexing characteristics equivalent to those of the MLD method.

The hardware configuration of the signal detecting units according to the third embodiment can also be achieved as illustrated in FIG. 6 or 7 similarly to the first embodiment.

The present invention has been described above with reference to the embodiments. It should be appreciated that there are various possible modifications of combinations of the components and the processes in the embodiments.

REFERENCE SIGNS LIST

1 communication system; 10 transmission device; 100 precoding unit; 30 propagation path; 20 reception device; 200 signal detecting unit; 210 signal splitting unit; 220 estimated signal vector calculating unit; 230 signal determining unit; 221 candidate point selecting unit; 222 signal estimating unit; 223 hypothesizing unit; 224 estimated value calculating unit; 500x processing circuit; 500v processor; 500z memory; 600 antenna.

The invention claimed is:

1. A reception device comprising:
   a receiver to receive a plurality of transmission signals via propagation paths orthogonal to each other, the transmission signals being obtained by multiplexing a plurality of first signals by using a precoding matrix, the first signals being L (L is an integer of 2 or larger) complex baseband signals whose real component and imaginary component are modulated independently of each other;
   a splitter to split each of the plurality of received signals received by the receiver into a real component and an imaginary component;
   a selector to narrow down possible signal point candidates of a real component of a first signal of the plurality of first signals to signal point candidates on a basis of the real component of the split received signal and narrow down possible signal point candidates of an imaginary component of the first signal to signal point candidates on a basis of the imaginary component of the split received signal;
   a signal point candidate provisional determiner to hypothesize one signal point candidate of a real component from the signal point candidates of a real component obtained by the narrowing down and hypothesize one signal point candidate of an imaginary component from the signal point candidates of an imaginary component obtained by the narrowing down; and
   a signal estimation value calculator to estimate a real component of the first signal on a basis of the one hypothesized real component signal point candidate and estimate an imaginary component of the first signal on a basis of the one hypothesized imaginary component signal point candidate.

2. The reception device according to claim 1, wherein
   the first signals are modulated by a $2^{2N}$-QAM (Quadrature Amplitude Modulation) technique (N is an integer of 2 or larger), and
   the selector selects, from among possible signal point candidates of the first signal, a signal point candidate that is closest to a signal point of the received signal and a signal point candidate that is closest to the received signal in each inverted bit among signal point candidates including an inverted bit with respect to each bit of the closest signal point candidate, and outputs the selected signal point candidates.

3. The reception device according to claim 1, wherein
   the first signals are modulated by a $2^{2N}$-QAM technique (N is an integer of 2 or larger), and
   when $y_m$ and $y_n$ represent input signals, $\phi mn$ and $\phi nm$ represent elements of a real number precoding matrix, and $\Delta m$ and $\Delta n$ represent transfer functions of the propagation paths,
   in a case where the input signals $y_m$ and $y_n$ satisfy formula (2), the selector narrows down signal point candidates to a total of ($2^{N-1}$+1) signal point candidates including a signal point candidate present in a region satisfying formula (2) and a signal point candidate that is closest to formula (1) in a region satisfying formula (3), and
   in a case where the input signals $y_m$ and $y_n$ satisfy formula (3), the selector narrows down signal point candidates to a total of ($2^{N-1}$+1) signal point candidates including a signal point candidate present in the region satisfying formula (3) and a signal point candidate that is closest to formula (1) in the region satisfying formula (2)

$$\frac{\Delta_m \phi_{mn}}{\Delta_n \phi_{nm}} y_n = y_m \qquad (1)$$

$$\frac{\Delta_m \phi_{mn}}{\Delta_n \phi_{nm}} y_n \leq y_m \qquad (2)$$

$$\frac{\Delta_m \phi_{mm}}{\Delta_n \phi_{nm}} y_n > y_m. \qquad (3)$$

4. The reception device according to claim 1, further comprising:
(L−2) stages of signal point candidate provisional determiner (L is an integer of 3 or larger) to hypothesize a signal point candidate for one component of a received multiplexed signal, the (L−2) stages of signal point candidate provisional determiner being located before the selector, wherein
the selector performs narrowing down on the complex baseband signals on a basis of the one component of the received multiplexed signal.

5. The reception device according to claim 1, wherein
the signal estimation value calculator calculates the real component of the first signal from a value of the one hypothesized real component signal point candidate, a real component of a received signal, and an equivalent channel vector associated with the one hypothesized real component signal point candidate, and
the signal estimation value calculator calculates the imaginary component of the first signal from a value of the one hypothesized imaginary component signal point candidate, an imaginary component of a received signal, and an equivalent channel vector associated with the one hypothesized imaginary component signal point candidate.

6. The reception device according to claim 1, further comprising:
a likelihood calculator to calculate, on a basis of a real component and an imaginary component of the first signals estimated by the signal estimation value calculator, likelihood of each of the real component and the imaginary component of the first signals, and output the likelihood.

7. A reception method comprising:
receiving a plurality of transmission signals via propagation paths orthogonal to each other, the transmission signals being obtained by multiplexing a plurality of first signals by using a precoding matrix, the first signals being L (L is an integer of 2 or larger) complex baseband signals whose real component and imaginary component are modulated independently of each other;
splitting each of the plurality of received signals into a real component and an imaginary component;
narrowing down possible signal point candidates of a real component of a first signal of the plurality of first signals to signal point candidates on a basis of the real component of the split received signal and narrowing down possible signal point candidates of an imaginary component of the first signal to signal point candidates on a basis of the imaginary component of the split received signal;
hypothesizing one signal point candidate of a real component from the signal point candidates of a real component obtained by the narrowing down and hypothesizing one signal point candidate of an imaginary component from the signal point candidates of an imaginary component obtained by the narrowing down; and
estimating a real component of the first signal on a basis of the one hypothesized real component signal point candidate and estimating an imaginary component of the first signal on a basis of the one hypothesized imaginary component signal point candidate.

8. A communication system comprising:
a transmission device including a transmitter to transmit a plurality of transmission signals via propagation paths orthogonal to each other, the transmission signals being obtained by multiplexing a plurality of first signals by using a precoding matrix, the fist signals being L (L is an integer of 2 or larger) complex baseband signals whose real component and imaginary component are modulated independently of each other; and
a reception device including:
a receiver to receive the transmission signals;
a splitter to split each of the plurality of received signals received by the receiver into a real component and an imaginary component;
a selector to narrow down possible signal point candidates of a real component of a first signal of the plurality of first signals to signal point candidates on a basis of the real component of the split received signal and narrow down possible signal point candidates of an imaginary component of the first signal to signal point candidates on a basis of the imaginary component of the split received signal;
a signal point candidate provisional determiner to hypothesize one signal point candidate of a real component from the signal point candidates of a real component obtained by the narrowing down and hypothesize one signal point candidate of an imaginary component from the signal point candidates of an imaginary component obtained by the narrowing down; and
a signal estimation value calculator to estimate a real component of the first signal on a basis of the one hypothesized real component signal point candidate and estimate an imaginary component of the first signal on a basis of the one hypothesized imaginary component signal point candidate.

* * * * *